(12) United States Patent
Harper

(10) Patent No.: US 7,687,193 B2
(45) Date of Patent: Mar. 30, 2010

(54) ELECTROCHEMICAL BATTERY INCORPORATING INTERNAL MANIFOLDS

(75) Inventor: Matthew A. M. Harper, Vancouver (CA)

(73) Assignee: JD Holding Inc., George Town, Grand Cayman (KY)

( * ) Notice: Subject to any disclaimer, the term of this patent is extended or adjusted under 35 U.S.C. 154(b) by 0 days.

(21) Appl. No.: 11/893,929

(22) Filed: Aug. 17, 2007

(65) Prior Publication Data

US 2009/0047570 A1 Feb. 19, 2009

(51) Int. Cl.
 *H01M 4/36* (2006.01)
(52) U.S. Cl. ...................................... 429/101
(58) Field of Classification Search ................ 429/50, 429/51, 81, 101–109, 70
See application file for complete search history.

(56) References Cited

U.S. PATENT DOCUMENTS

| | | | |
|---|---|---|---|
| 3,666,561 A | 5/1972 | Chiku | |
| 4,312,735 A | 1/1982 | Grimes et al. | |
| 4,371,433 A | 2/1983 | Balko et al. | |
| 5,484,666 A | 1/1996 | Gibb et al. | |
| 5,486,430 A | 1/1996 | Gorbell et al. | |
| 6,475,661 B1 | 11/2002 | Pellegri et al. | 429/105 |
| 6,524,452 B1 * | 2/2003 | Clark et al. | 204/254 |
| 6,544,679 B1 | 4/2003 | Petillo et al. | |
| 7,052,796 B2 | 5/2006 | Sabin et al. | |
| 7,258,947 B2 | 8/2007 | Kubata et al. | |
| 7,361,427 B1 | 4/2008 | Dow et al. | |
| 2003/0087156 A1 | 5/2003 | Broman et al. | |
| 2005/0158615 A1 | 7/2005 | Samuel et al. | |

FOREIGN PATENT DOCUMENTS

| | | |
|---|---|---|
| JP | 07-14617 | 1/1995 |
| JP | 08-7913 | 1/1996 |
| JP | 2004-319341 A | 11/2004 |

OTHER PUBLICATIONS

International Search Report for PCT/US07/79444 filed Sep. 25, 2007, and mailed Aug. 13, 2008, 4 pgs.
Written Opinion of the International Searching Authority for PCT/US07/79444 filed Sep. 25, 2007, and mailed Aug. 13, 2008, 3 pgs.
International Search Report for PCT/US07/14277 filed Jun. 18, 2007, mailed on Aug. 18, 2008, 4 pgs.
Written Opinion of the International Searching Authority for PCT/US07/14277 filed Jun. 18, 2007, mailed on Aug. 18, 2008, 4 pgs.

* cited by examiner

*Primary Examiner*—Dah-Wei D Yuan
*Assistant Examiner*—Maria J Laios
(74) *Attorney, Agent, or Firm*—John R. Thompson; Stoel Rives LLP

(57) ABSTRACT

An electrochemical battery includes a plurality of cells, each cell including negative and positive compartments to contain electrolyte solution. A manifold includes an outer manifold plate coupled to an inner manifold plate to supply and return electrolyte solution to the compartments. Each manifold plate includes supply shunt passages to convey electrolyte solution to the cells and return shunt passages to receive electrolyte solution from the cells.

35 Claims, 17 Drawing Sheets

ELECTROCHEMICAL BATTERY INCORPORATING INTERNAL MANIFOLDS

TECHNICAL FIELD

The disclosure relates to electrochemical energy storage systems, in particular to systems and methods for feeding reactant to electrochemical cells.

BRIEF DESCRIPTION OF THE DRAWINGS

The various aspects and advantages of the invention are described by way of example in the following description of several embodiments and attached drawings. It should be understood that the accompanying drawings depict only typical embodiments and, as such, should not be considered to limit the scope of the claims. The embodiments will be described and explained with specificity and detail in reference to the accompanying drawings in which:

DETAILED DESCRIPTION OF PREFERRED EMBODIMENTS

Figure 1:
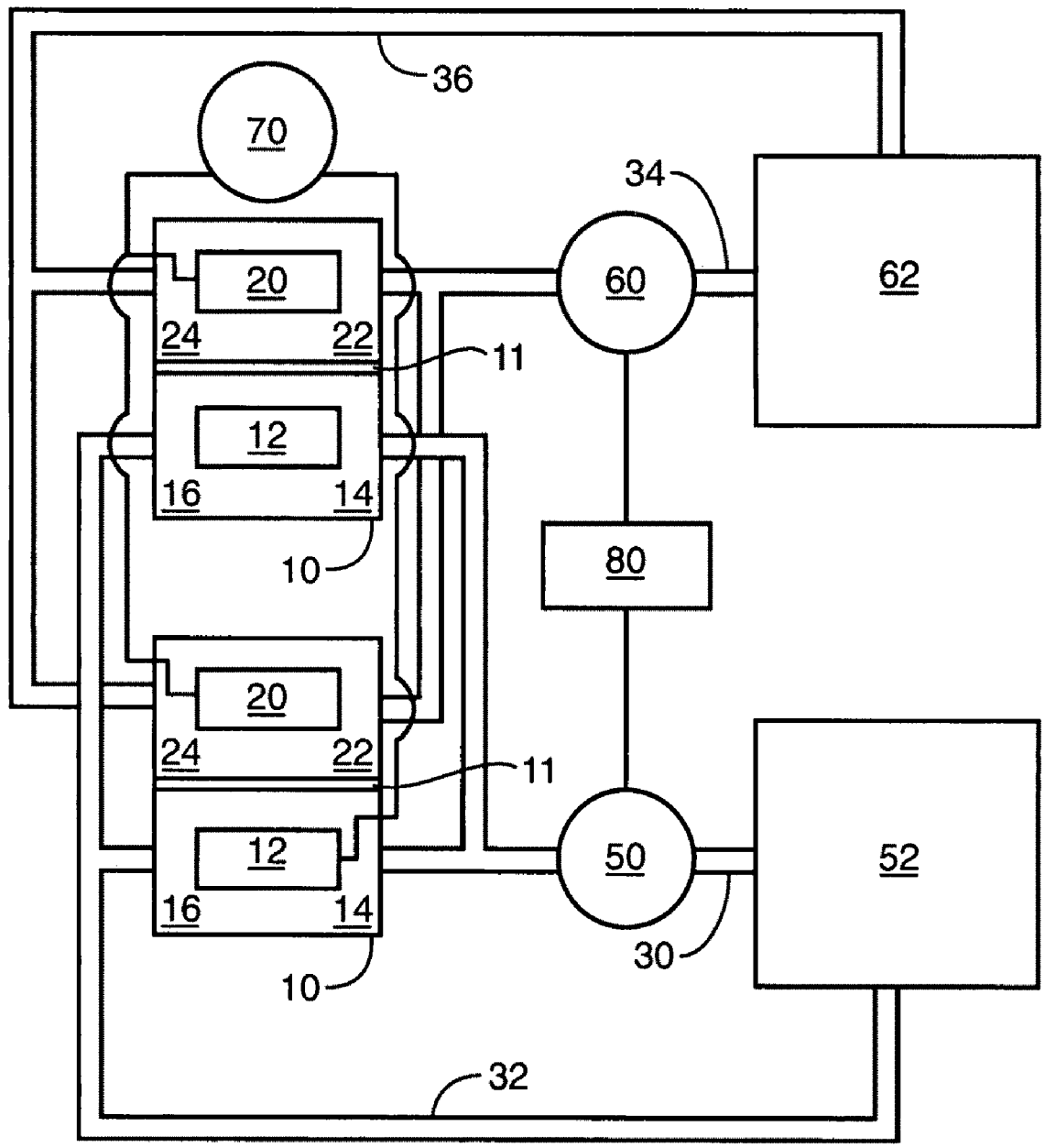
FIG. 1 is a block diagram of one embodiment of an electrochemical energy storage system.

Embodiments of a electrochemical energy storage system are described herein. In the following description, numerous details provide a thorough understanding of embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. The phrases "connected to," "coupled to," and "in communication with" refer to any form of interaction between two or more entities, including mechanical, electromagnetic, and fluid communication. The term "abutting" refers to items that are in direct physical contact with each other, although the items may not be attached together.

Energy storage systems, such as electrochemical, rechargeable batteries, are an important part of electrical power systems, particularly electrical power systems supplied by wind turbine generators, photovoltaic cells, or the like. Energy storage systems may also be used to: enable energy arbitrage, the selling and buying power during off-peak hours; as uninterruptible power sources (UPS) to provide backup power; and in power quality applications in conjunction with a prime power source.

In one embodiment, an electrochemical battery generates electrical power by passing anolyte and catholyte electrolytic solutions through one or more cells. An electrochemical battery may include any number and configuration of cells depending on the instantaneous power demands of the system. Similarly, an electrochemical battery may have varying amounts of electrolyte solution available to it depending upon the energy capacity needs of the system. The number of cells may determine the amount of instantaneous power the electrochemical battery is capable of producing. The volume of anolyte and catholyte electrolytic solutions available to the electrochemical battery generally defines its power storage and production capacity.

It is advantageous for stacks of electrochemical cells to be arranged in series electrically with parallel electrolyte solution flow paths. However, in stacks whose reactant electrolyte solutions are conductive, an electric current may be induced. The electrical losses associated with these "shunt currents" are commonly known as "shunt losses." These losses occur because a conductive path exists between adjacent cells that are at a different electrical potential. This difference of potential, which induces current and creates corresponding power loss, is small between immediately adjacent cells. However, when many cells are combined into a stack, as is typical practice, the electrical potential driving this electrical flow increases. Thus, the electrical current through the fluid connections increases and the "shunt losses" increase according to the electrical power law, $P=I^2R$.

Many electrochemical stacks do not suffer this problem, as the conductivity of the working fluids is quite low. For example, fuel cells that use gas reactants have low conductivity. A common strategy used in industrial electrochemical stacks, where the product of the electrochemical reaction is a chemical species, is to artificially induce a counter-acting electrical current in the shunts to reduce the electron flow between cells. However, this is impractical in an application where the product of the reaction is electricity, as the losses associated with this technique are significant.

Another strategy uses air bubbles to reduce the effective conductivity of the process connections. This process is impractical, as the required apparatus is expensive, the gains are small, and many reactants are adversely affected by air.

Electrochemical cells, whether their product be electricity or chemical species, use artificially long channels or "shunts" on the inlets to the cells. These increase the length of the fluid path and, thus, the electrical resistance between adjacent cells, thereby reducing the shunt losses. Another technique is to limit the number of cells that are directly combined into a single stack. However, this limits the number of cells that can share common electrical and electrolyte solution connection hardware. The connection hardware is a significant component of the overall stack system cost. Yet another technique is to connect individual stacks to the main process lines with long external pipes. As with the shunt strategy discussed above, this increases the effective electrical resistance between adjacent stacks.

FIG. 1 is a block diagram of one embodiment of an electrochemical battery 100 incorporating a plurality of cells 10. One of skill in the art will appreciate that electrochemical batteries may includes a wide variety of embodiments, the block diagram is shown for illustrative purposes. Accordingly, the number of cells 10 may vary as desired. Each cell 10 may comprise a negative electrode 12 disposed within a negative compartment 14 and a positive electrode 20 disposed within a positive compartment 22.

The negative compartment 14 may include anolyte solution 16 in electrical communication with negative electrode 12. The anolyte solution 16 may be an electrolyte, containing redox ions which are in a reduced state and are to be oxidized during a discharge process of the cell 10, or are in an oxidized state and are to be reduced during the charging process of the cell 10, or which are a mixture of reduced ions and ions to be reduced.

By way of example, the battery 100 may be a vanadium redox battery, and the charge-discharge redox reaction occurring at negative electrode 12 in anolyte solution 16 may be represented by Equation 1.1:

$$V^{2+} \leftrightarrow V^{3+} + e^-$$ 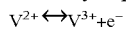 Eq. 1.1

However, one of skill in the art will appreciate that the teachings disclosed herein have application to electrochemical batteries in general.

The positive compartment 22 may contain a catholyte solution 24 in electrical communication with a positive electrode 20. The catholyte solution 24 may be an electrolyte containing specified redox ions which are in an oxidized state and are to be reduced during the discharge process of a cell 10, or are in a reduced state and are to be oxidized during the charging process of the cell 10, or which are a mixture of these oxidized ions and ions to be oxidized. By way of example, the charge-discharge redox reaction occurring at the positive electrode 20 in the catholyte solution 24 may be represented by Equation 1.2:

$$V^{4+} \leftrightarrow V^{5+} + e^-$$ 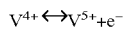 Eq. 1.2

The anolyte solution 16 and the catholyte solution 24 may be prepared in accordance with the teachings of U.S. Pat. Nos. 4,786,567, 6,143,443, 6,468,688, and 6,562,514, which are hereby incorporated by reference, or by other techniques known in the art.

In one embodiment, each cell 10 may include an ionically conducting membrane 11 disposed between the positive compartment 22 and the negative compartment 14 of a cell 10. The membrane 11 may be in fluid contact with the catholyte solution 24 and the anolyte solution 16 to provide ionic communication therebetween. The membrane 11 may serve as a proton exchange membrane. The membrane 11 may be embodied as an anion membrane or a cation membrane and may include a carbon material which may be perfluorinated.

The anolyte solution 16 may be held in an anolyte reservoir 52. The anolyte reservoir 52 may be embodied as a tank, bladder, IBC, or other container capable of holding an anolyte solution known in the art. The anolyte reservoir 52 may be in fluid communication with the negative compartment 14 via an anolyte supply connection 30 and an anolyte return connection 32. In embodiment 100, the anolyte solution contained in the anolyte reservoir 52 may flow to cell 10 via the anolyte supply connection 30 and flow from cell 10 to the anolyte reservoir 52 via the anolyte return connection 32. The anolyte supply connection 30 and the anolyte return connection 32 may comprise any type of fluid transporting means known in the art capable of containing an anolyte solution. In one embodiment, the anolyte supply connection 30 and the anolyte return connection 32 may comprise any fluid conduit capable of containing an electrolyte solution.

The catholyte solution 24 may be held in a catholyte reservoir 62. The catholyte reservoir 62 may be embodied as a tank, bladder, IBC, or other container capable of holding a catholyte solution known in the art. The catholyte reservoir 62 may be in fluid communication with positive compartment 22 via a catholyte supply connection 34 and a catholyte return connection 36. In embodiment 100, the catholyte solution contained in the catholyte reservoir 62 may flow to the cell 10 via the catholyte supply connection 34 and flow from cell 10 to the catholyte reservoir 62 via the catholyte return connection 36.

In embodiment 100, the anolyte supply connection 30 may be in fluid communication with an anolyte pump 50. The anolyte pump 50 may regulate and enable the flow of anolyte solution within the anolyte reservoir 52 through the anolyte supply connection 30 into the negative compartment 14. The anolyte pump 50 may further regulate and enable anolyte 16 to flow from negative compartment 14 through the anolyte return line 32 into the anolyte reservoir 52. The anolyte pump 50 may be a variable flow-rate pump, wherein the rate of the anolyte pump 50 determines the flow rate of anolyte 16 through the negative compartment 14. The anolyte pump 50 may be communicatively coupled to a system controller 80. In embodiment 100, the system controller 80 may regulate the flow of anolyte through the negative compartment 14 by controlling the flow-rate of the anolyte pump 50.

In embodiment 100, the catholyte supply connection 34 may be in fluid communication with the catholyte pump 60. The catholyte pump 60 may enable flow of catholyte solution within first catholyte reservoir 62 through the catholyte supply connection 34 and into the positive compartment 22. The catholyte pump 60 may be a variable flow-rate pump, wherein the rate of the catholyte pump 60 determines the flow-rate of catholyte 24 through a positive compartment 22. The catholyte pump 60 may be communicatively coupled to the system controller 80. In embodiment 100, the system controller 80 may regulate the flow of catholyte through the positive compartment 22 by controlling the flow-rate of the catholyte pump 60.

The negative electrode 12 and positive electrode 20 may be in electrical communication with switching module 70. The switching module 70 may be capable of electrically coupling negative electrode 12 and positive electrode 20 to power source (not shown) or load (not shown). The switching module 70 may be disposed in series between a power source and each negative electrode 12. The switching module 70 may also be disposed in series between a load and each negative electrode 12. This circuit arrangement allows the switching module 70 to selectably connect the battery 100 to a power source or load. In embodiment 100, the switching module 70 is communicatively coupled to the system controller 80, allowing the system controller 80 to selectively connect a cell 10 with a power source or load. One skilled in the art will appreciate that alternative circuit layouts and configurations are possible, as such, the embodiment of FIG. 1 is provided for illustrative purposes only.

The anolyte and catholyte electrolytic solutions of battery 100 may be charged by configuring the switching module 70 to connect a power source to the negative electrode 12 and the positive electrode 20 of each cell 10. The electrical energy delivered through the negative electrode 12 may produce divalent vanadium ions in the anolyte solution 16 as represented by Equation 1.3:

$$V^{3+} + e^- \rightarrow V^{2+} \qquad \text{Eq. 1.3}$$

The electrical energy delivered through the positive electrode 20 may produce quinvalent vanadium ions in catholyte solution 24 as represented by Equation 1.4:

$$V^{5+} + e^- \rightarrow V^{4+} \qquad \text{Eq. 1.4}$$

The switching module 70 may be configured to withdraw electrical energy from cell 10 by connecting cell 10 to a load. This causes the load to withdraw electrical energy from the anolyte solution 16 within the negative compartment 14 and the catholyte solution 24 within positive compartment 22. This withdrawal of electrical energy may produce trivalent vanadium ions within the anolyte solution 16 as represented by Equation 1.5 and may produce quadvalent vanadium ions in the catholyte solution 24 within the positive compartment 22 as represented by Equation 1.6:

$$V^{2+} \rightarrow V^{3+} + e^- \qquad \text{Eq. 1.5}$$

$$V^{4+} \rightarrow V^{5+} + e^- \qquad \text{Eq. 1.6}$$

As electrical energy is withdrawn from cell 10, the anolyte solution 16 within the negative compartment 14 and the catholyte solution 24 within the positive compartment 22 may become discharged. As such, the anolyte pump 50 may be used to circulate additional anolyte into the negative compartment 14 via the anolyte supply connection 30, expelling anolyte 16 within the negative compartment 14 via the anolyte return connection 32. The catholyte pump 60 may be used to pump catholyte via the catholyte supply connection 34 into the positive compartment 22, forcing catholyte 24 within positive compartment 22 to flow out of the positive compartment 22 via catholyte return connection 36.

Figure 2:
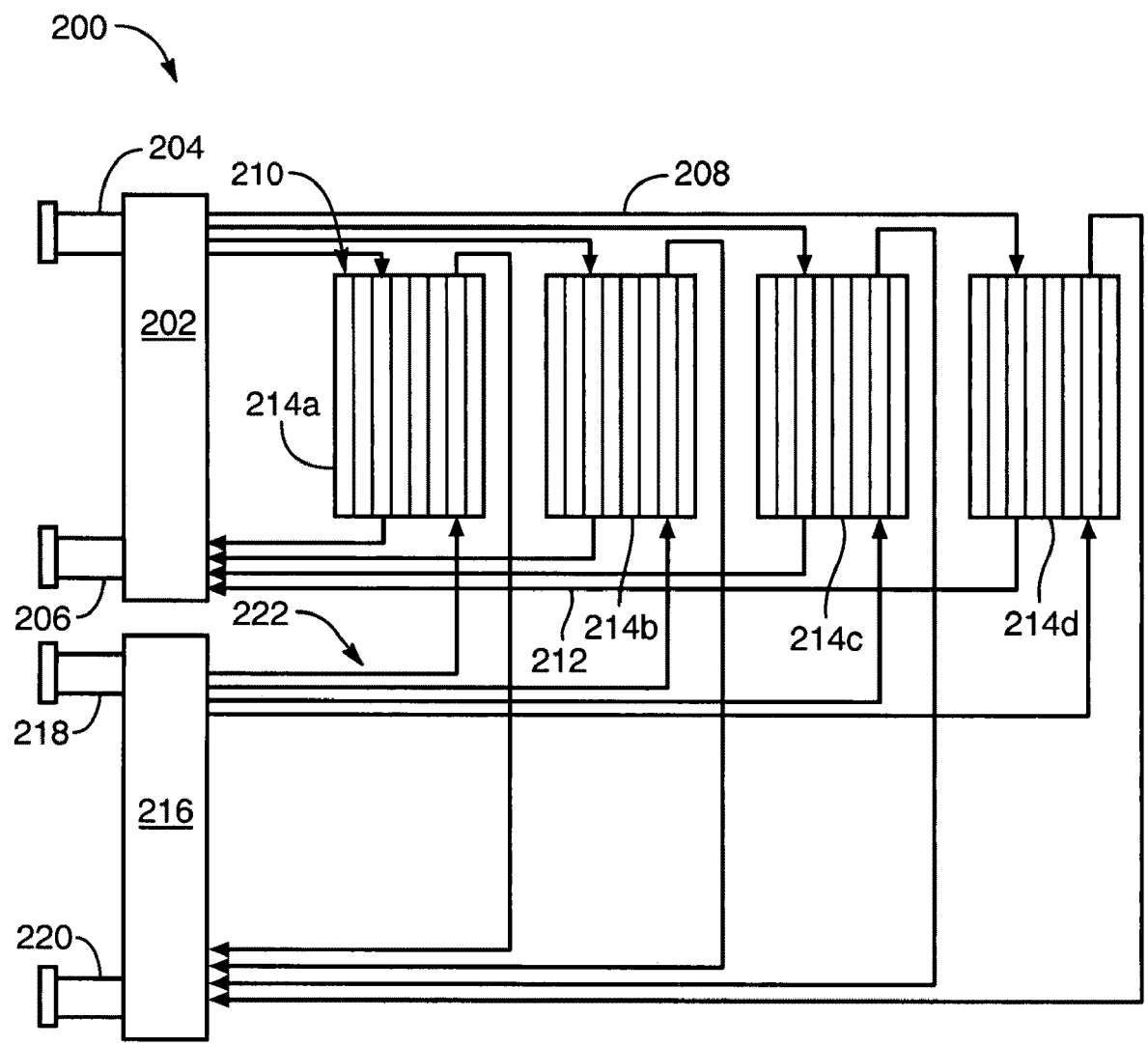
FIG. 2 is a block diagram of an alternative embodiment of an electrochemical energy storage system.

Referring to FIG. 2, a block diagram of an electrochemical battery is shown 200. The battery 200 includes a positive manifold 202 in communication with first and second valves 204, 206. First valve 204 provides an input of positive electrolyte solution, and second valve 206 provides the output of positive electrolyte solution. The positive manifold 202 is configured with multiple parallel supply lines 208 to simultaneously deliver a positive electrolyte solution to cells 210. Similarly, multiple parallel return lines 212 are in fluid communication with the cells 210. The cells 210 may be assembled into stacks 214a-d, with each stack 214 in fluid communication with a supply line 208 and a return line 212. The number of cells 210 in each stack 214 may vary as desired.

In this manner, individual cells 210 in a stack 214 are serviced by the same supply and return lines 208, 212. Similarly, a negative manifold 216 is in fluid communication with input and output valves 218, 220 to provide a flow path for a negative electrolyte solution. The negative manifold 216 is configured with multiple parallel supply lines 222 and return lines 224 to deliver and retrieve a negative electrolyte solution from the cells 210.

The solutions flowing through stack 214a are separated from the solutions flowing through the other stacks 214b-d. Indeed, the solutions running through stack 214a are significantly separated from the solutions flowing through stack 214d. This separation breaks the electrical connection that typically happens in manifold with single supply and return lines. Accordingly, shunt losses are reduced, as many cells may be combined into stacks while limiting the increased electrical potential and the increased induced current.

Figure 3:
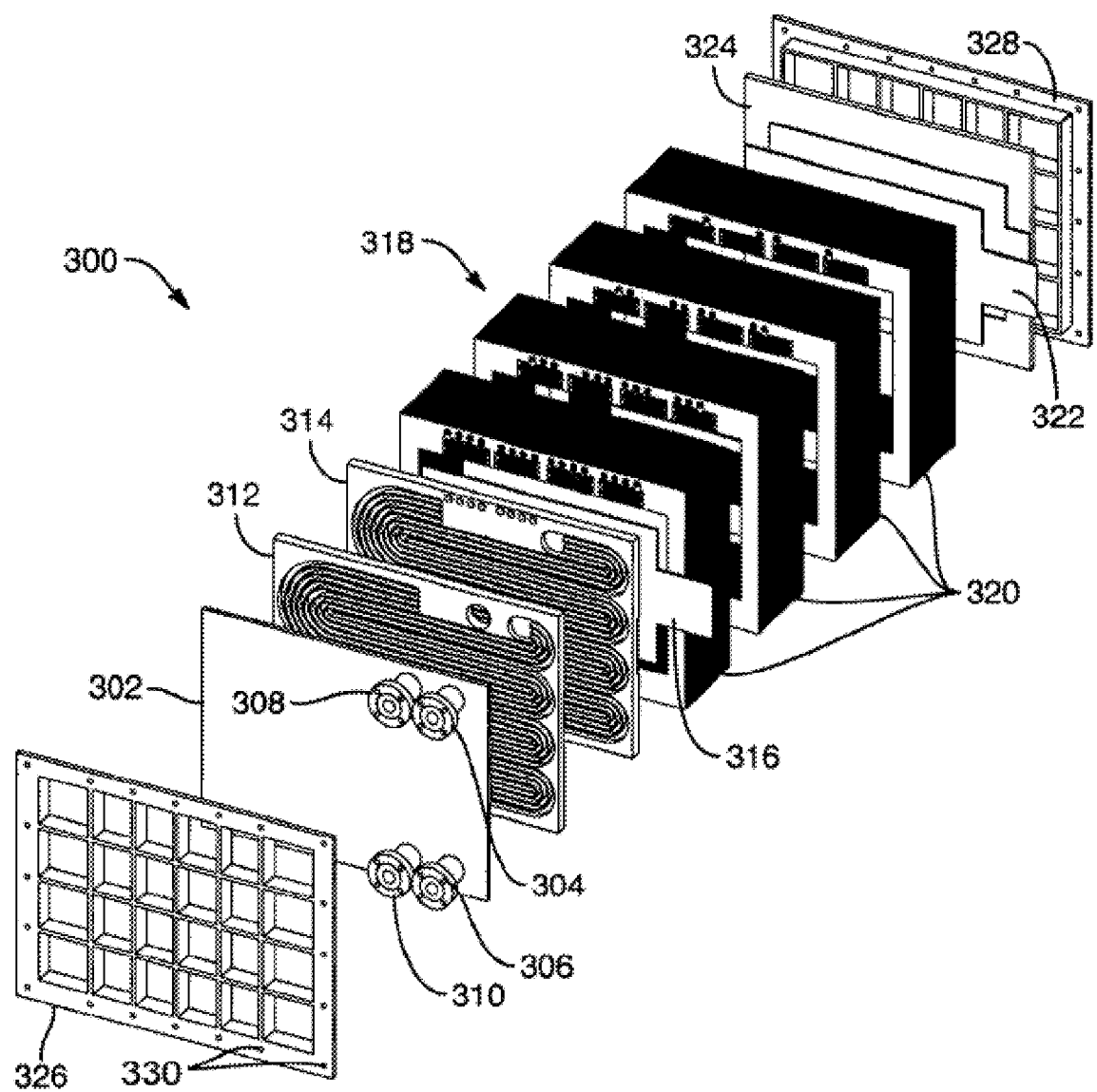
FIG. 3 is an exploded view of an embodiment of an electrochemical energy storage system.

Referring to FIG. 3, an exploded view of an embodiment of an electrochemical battery 300 is shown. The battery 300 includes a manifold cover plate 302 that supports positive input and output 304, 306 and negative input and output 308, 310. The term positive and negative is used herein to refer to positive and negative electrolyte solutions, such as catholyte and anolyte solutions. The input and outputs 304, 306, 308, and 310 provide electrolyte flow paths into and out of the battery 300. The input and outputs 304, 306, 308, and 310 may be embodied as pipes, tubes, cylinders or other structural members capable of conveying electrolyte solution.

The battery 300 includes an outer manifold plate 312 disposed adjacent to the manifold cover plate 302. The outer manifold plate 312 is configured to distribute the positive solution to the appropriate supply channels and to receive positive solution from the return channels. An inner manifold plate 314 couples to the outer manifold plate 312 and is configured to distribute the negative solution to the appropriate supply channels and to receive negative solution from the return channels. The outer and inner manifolds 312, 314 are disposed at the end of stack in two parallel and adjacent planes. Rather than using external pipes, the supply and return channels are in fluid communication with the manifold plates 312, 314.

The battery 300 may include a current collector 316 that is disposed between the inner manifold plate 314 and a proximate end of a stack 318 of cells. The current collector 316 is formed of a conductive material and enables current flow with the battery 300.

The stack 318 includes a plurality of cells and may be divided into sub-stacks 320. Each sub-stack 320 has corresponding supply and return channels to provide a flow path for all cells contained therein. Each cell is disposed parallel to the other cells. As can be appreciated, the number of cells in a sub-stack 320 may vary, as does the number of cells in the entire stack 318. Although four sub-stacks 320 are shown, this number may be varied as well. Thus, the illustrated embodiment is provided for exemplary purposes only and should not be considered limiting of the teachings disclosed herein.

The battery 300 may include a second current collector 322 that is disposed on the opposing end of the stack 318 to enable current flow. A cover plate 324 is disposed adjacent the second current collector 322 to support and secure the stack 318.

First and second end plates 326, 328 are disposed on opposing ends of the battery 300 and sandwich the elements to thereby secure their position. The end plates 326, 328 may be embodied as structured frames and configured with rod apertures 330 along their perimeter. A plurality of rods (not shown) are received into corresponding rod apertures 330 in the support frames. Each rod is then secured into a fixed position in the apertures 330 by conventional means known in the art, such as screws, rivets, bolts, and the like.

To facilitate the illustration, certain elements are not shown in FIG. 3. For example, each cell includes positive and negative electrolyte compartments, positive and negative electrodes, and a membrane. These elements are discussed above in reference to FIG. 1. Furthermore, each cell also includes a bipolar plate (not shown) which divides an individual cell from an adjacent cell. The bipolar plate ensures that electrolyte solutions from adjacent cells are separated and maintained in their respective compartments.

Figure 4:
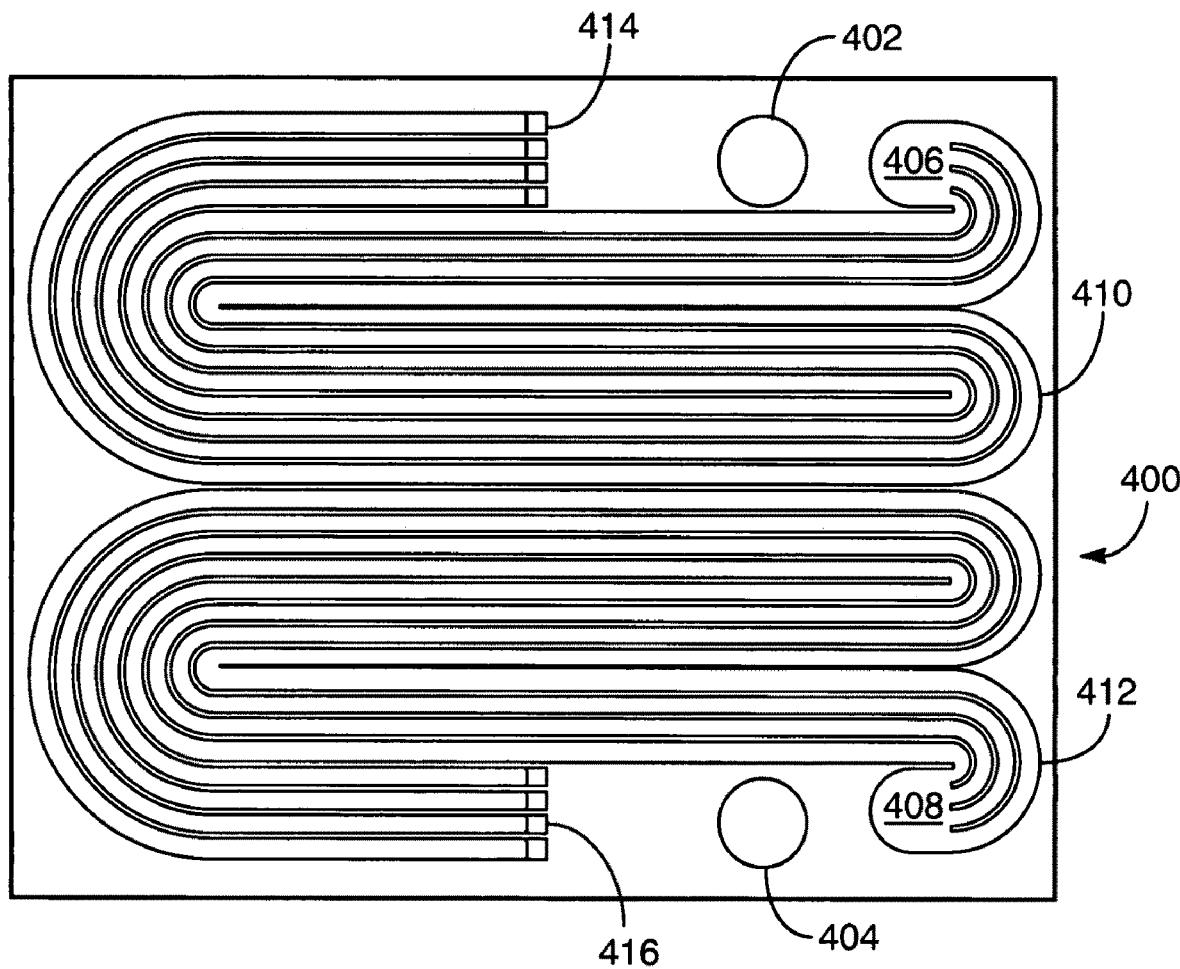
FIG. 4 is a plan view of an embodiment of an outer manifold.

Referring to FIG. 4, a plan view of an embodiment of the outer side of an outer manifold plate 400 is shown. The plate 400 includes input and output apertures 402, 404 to allow the negative input and output to communicate with the inner manifold plate. The plate 400 includes input and output wells 406, 408 that are aligned with the positive input and output to enable fluid communication. The input and output wells 406, 408 provide the entire fluid connections for the positive solution.

Each well 406, 408 is in communication with corresponding supply and return shunt passages 410, 412, which are formed into the plate 400. The shunt passages 410, 412 may be configured as extended serpentine paths to maximize their length. The shunt passages 410, 412 may run parallel to one another, and their length is limited by the surface area of the plate 400 and the number of passages 410, 412. The path length serves to increase the electrical resistance and reduce shunt currents. This technique is less expensive than using long runs of individual pipes to increase resistance.

In the illustrated embodiment, four supply shunt passages 410 and four return shunt passages 412 are shown. As can be appreciated by one of skill in the art, this number may vary as required. Each supply shunt passage 410 terminates at a corresponding passage supply aperture 414. Thus, electrolyte solution flows from the well 406, through the supply shunt passages 410 and exits through the supply apertures 414. The supply apertures 414 extend through the plate 400. Similarly, each return shunt passage 412 originates at a corresponding passage return aperture 416, which extends through the plate 400. The electrolyte solution returns through the return apertures 416, flows through the return shunt passages 412, proceeds to the well 408, and exits through the corresponding output.

Figure 5:
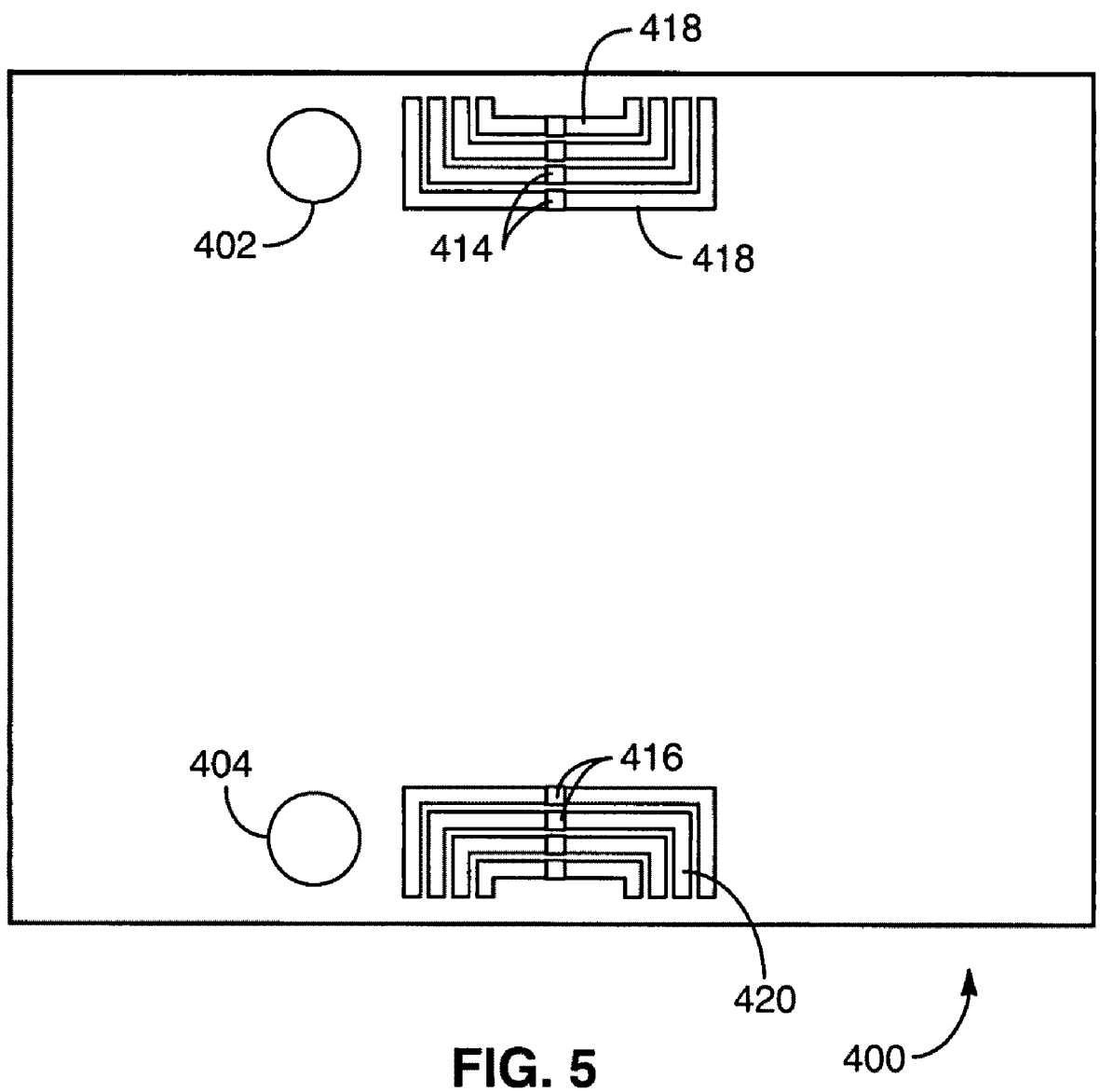
FIG. 5 is a plan view of the reverse side of the outer manifold of FIG. 4.

Referring to FIG. 5, a plan view of an opposing side (the inner side) of the outer manifold plate 400 of FIG. 4 is shown. Each supply aperture 414 is in communication with one or more plate supply channels 418 which are configured to distribute the electrolyte solution. Likewise, each return aperture 416 is in communication with one or more plate return channels 420 which are configured to receive electrolyte solution. In the illustrated embodiment, the apertures 414, 416 are each in communication with two corresponding supply and return channels 418, 420. As shown, the plate 400 is an integrated and unitary device that distributes the supply and return of electrolyte solution. The outer side of the plate 400 abuts the manifold cover plate and is disposed in a fixed relationship to the manifold cover plate to prevent seepage. In certain embodiments, gaskets, bonding material, and other means known in the art may be used to maintain the fluid.

The outer manifold plate 400 may be described as a single-sided dual port manifold. The outer manifold plate 400 has the wells 406, 408 and the shunt passages 410, 412 on only one side, and is thereby referenced as being single-sided. The outer manifold plate 400 provides two inlets and two outlets for each cell (discussed below) in the sub-stacks. The two inlets are provided as there are two supply channels 418 for each supply aperture 414. Similarly, two outlets are provided as there are two return channels 420 for each return aperture 416. The two inlet and two outlet per cell manifold configuration is referenced herein as being dual port.

Figure 6:
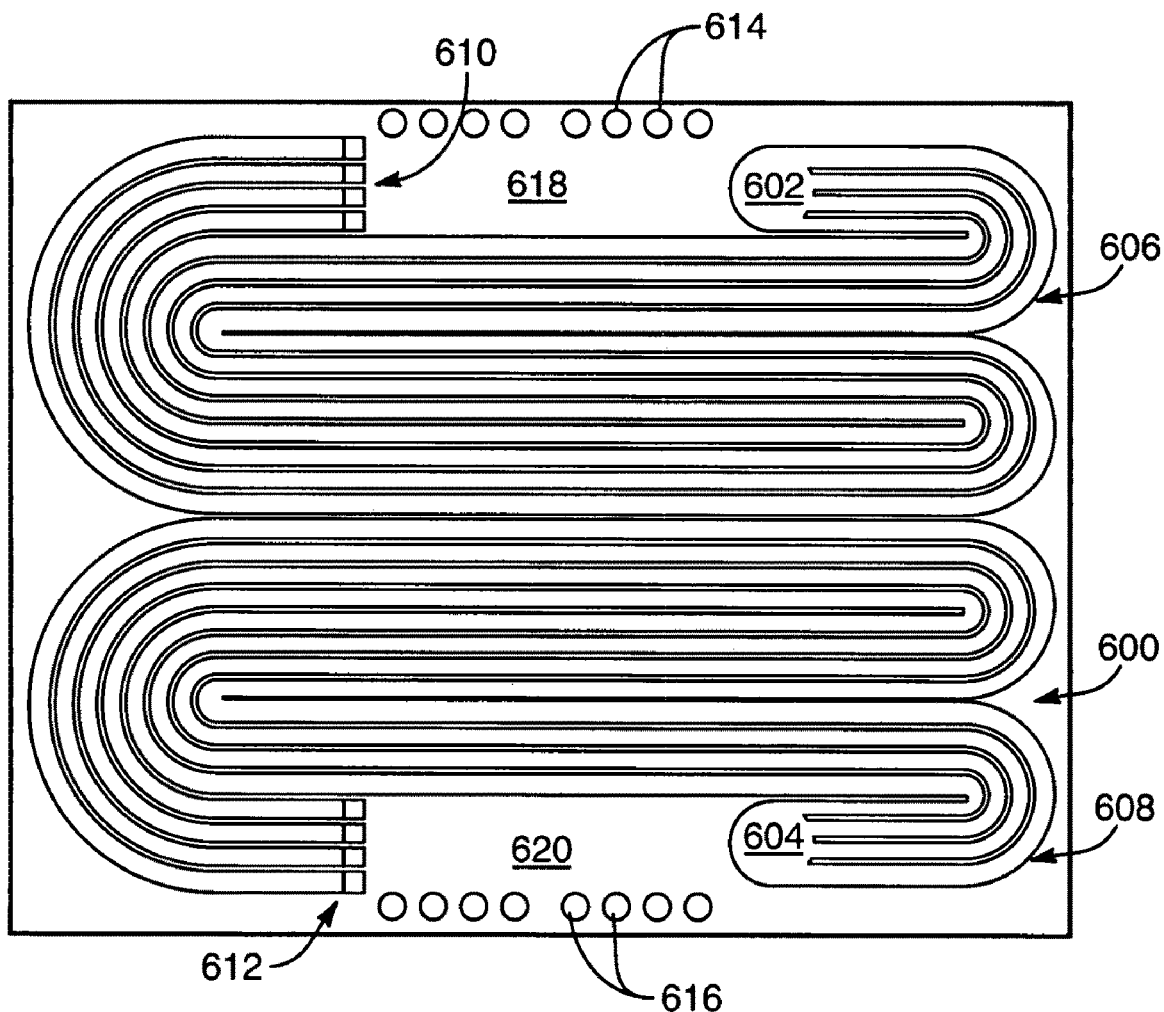
FIG. 6 is a plan view of an embodiment of an inner manifold.

Referring to FIG. 6, a plan view of an outer side of an embodiment of an inner manifold plate 600 is shown. The plate 600 includes input and output wells 602, 604 that are aligned with the negative input and output to enable fluid communication. The input and output wells 602, 604 provide the entire fluid connections for the negative solution. Each well 602, 604 is in communication with corresponding supply and return shunt passages 606, 608 which are formed in the plate 600.

As with the plate 400, the shunt passages 606, 608 may be configured as extended serpentine paths that run parallel to one another. In the illustrated embodiment, four supply shunt passages 606 and four return shunt passages 608 are shown, although this number may vary. Each supply shunt passage 606 terminates at a corresponding passage supply aperture 610 which extends through the plate 600. Electrolyte solution flows from the well 602, through the supply shunt passages 606, and exits through the supply apertures 610. Similarly, each return shunt passage 608 originates at a corresponding passage return aperture 612 which extends through the plate 600. The electrolyte solution returns through the return apertures 612, flows through the return shunt passages 608, proceeds to the well 604, and exits through the corresponding output.

The plate 600 includes a plurality of supply channel apertures 614 that extend through the plate 600. Each supply channel aperture 614 is aligned to be in fluid communication with a corresponding plate supply channel 418 shown in FIG. 5. As shown, eight supply channel apertures 614 are used to communicate with the eight plate supply channels 418. Each supply channel aperture 614 communicates with a supply channel formed in the cell frames as discussed below.

The plate 600 also includes a plurality of return channel apertures 616 that extend through the plate 600. Each return channel aperture 616 is aligned to be in fluid communication with a corresponding plate return channel 420 shown in FIG. 5. As shown, eight return channel apertures 616 are used to communicate with the eight plate return channels 420. Each return channel aperture 616 communicates with a supply channel formed in the cell frames as discussed below.

The plate 600 further includes a first reserved space 618 that is configured to abut the supply apertures 414 and plate supply channels 418. Similarly, a second reserved space 620 is configured to abut the return apertures 416 and plate return channels 420. When the inner manifold plate 600 is coupled to the outer manifold plate 400, the channels 418, 420 are sealed between.

Figure 7:
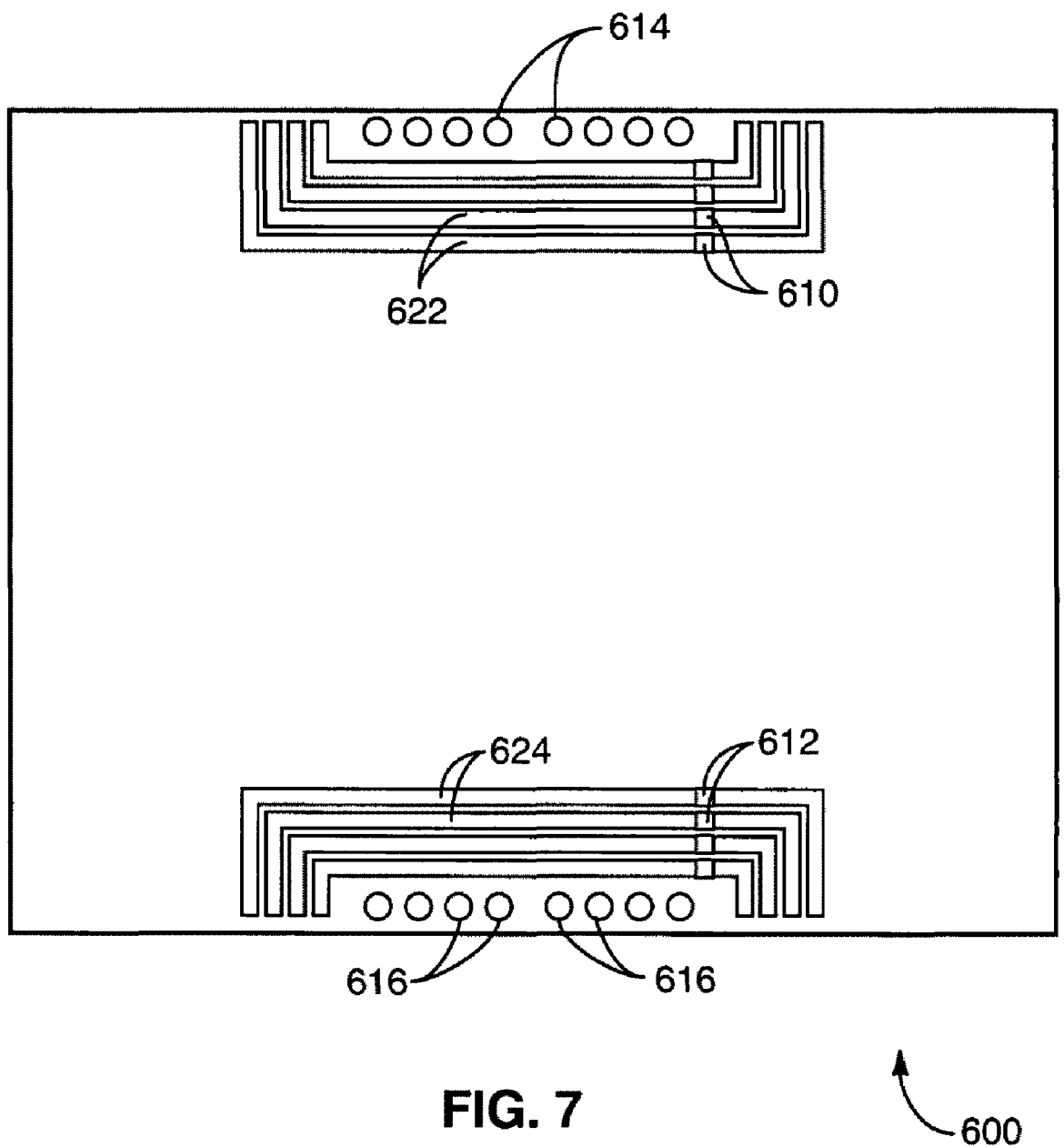
FIG. 7 is a plan view of the reverse side of the inner manifold of FIG. 6.

Referring to FIG. 7, a plan view of an opposing side (the inner side) of the inner manifold plate 600 of FIG. 6 is shown. Each supply aperture 610 is in communication with one or more plate supply channels 622 which are configured to distribute the electrolyte solution. Likewise, each return aperture 612 is in communication with one or more plate return channels 624 which are configured to receive electrolyte solution. In the illustrated embodiment, the apertures 610, 612 are each in communication with two corresponding supply and return channels 622, 624. As with plate 400, the inner manifold plate 600 is an integrated and unitary device that distributes the supply and return of electrolyte solution. The plate 400 is disposed to abut the other elements of the battery to prevent seepage.

The inner manifold plate 600 may also be described as a single-sided dual port manifold. The inner manifold plate 600 has the wells 602, 604 and shunt passages 606, 608 on only one side. The inner manifold plate 600 provides two inlets and two outlets for each cell. The two inlets are provided by two supply channels 622 for each supply aperture 610. Similarly, two outlets are provided by two return channels 624 for each return aperture 612.

As can be appreciated, an outer manifold plate and an inner manifold plate may be configured as single-sided single port manifolds. In such an embodiment, the wells and shunt passages are disposed on one side of the manifold plates. The single port configuration may be provided by single supply channels corresponding to each supply aperture and single return channels corresponding to each return aperture. In such an embodiment, each cell is provided with a single electrolyte inlet and a single electrolyte outlet. This differs from the dual inlet and dual outlet embodiments shown in reference to FIGS. 10 through 15 below.

The outer manifold plate and inner manifold plate together operate as a manifold for an electrochemical battery. The manifold plates provide an efficient and reliable method of distributing and cycling electrolyte solution and are a substantial improvement over systems incorporating extensive use of pipes. Although reference has been made to the outer manifold plate supplying and returning a positive solution and the inner manifold plate supplying and returning a negative solution, these functions may be exchanged between the manifold plates. Thus, the inner manifold plate may be used to provide a positive solution, and the outer manifold plate may be used to provide a negative solution.

Figure 8:
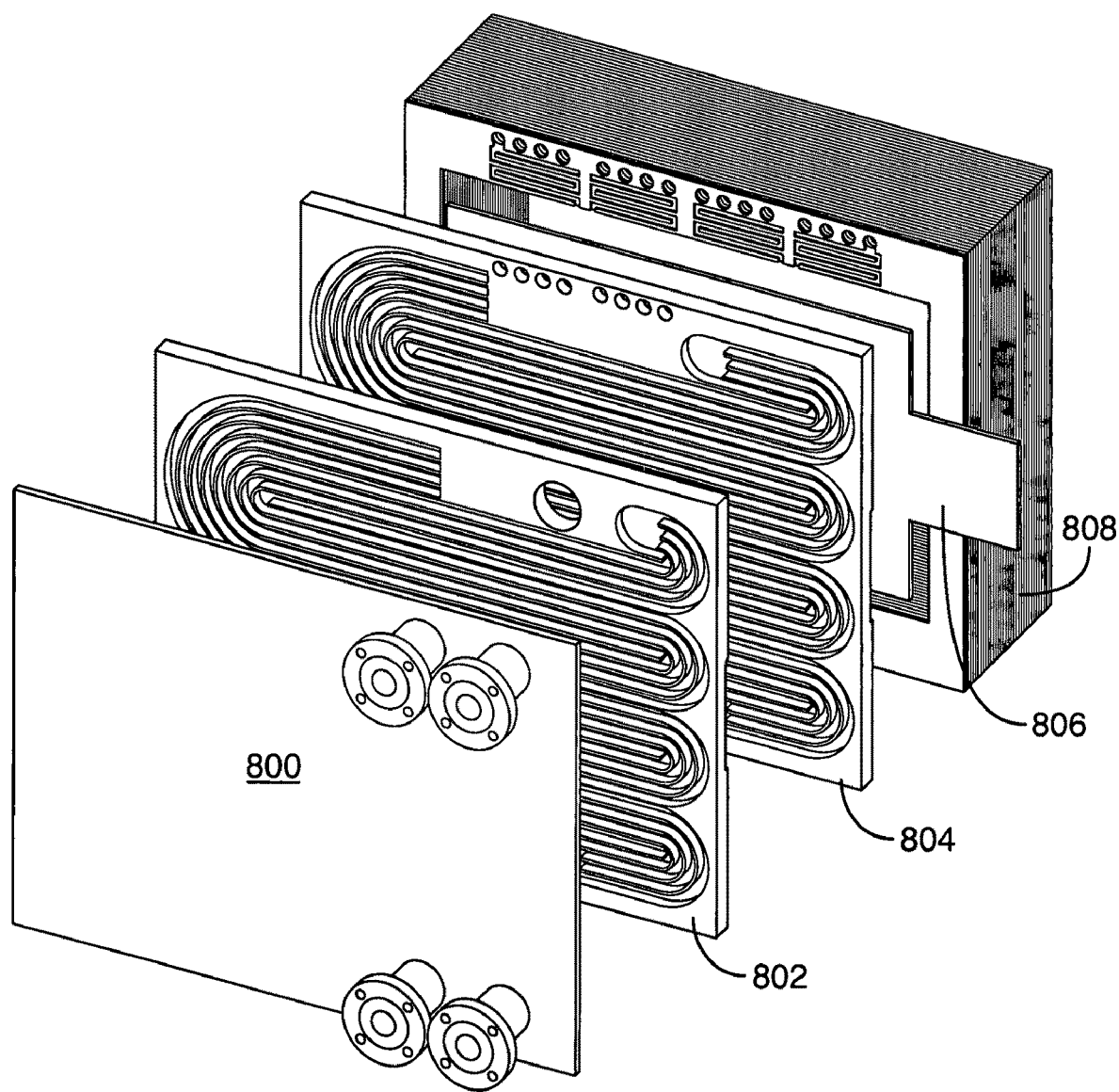
FIG. 8 is a perspective view of a portion of an embodiment of an electrochemical energy storage system.

Referring to FIG. 8, an outside perspective view of the manifold cover plate 800, outer manifold plate 802, inner manifold plate 804, current collector 806, and a sub-stack 808 is shown.

Figure 9:
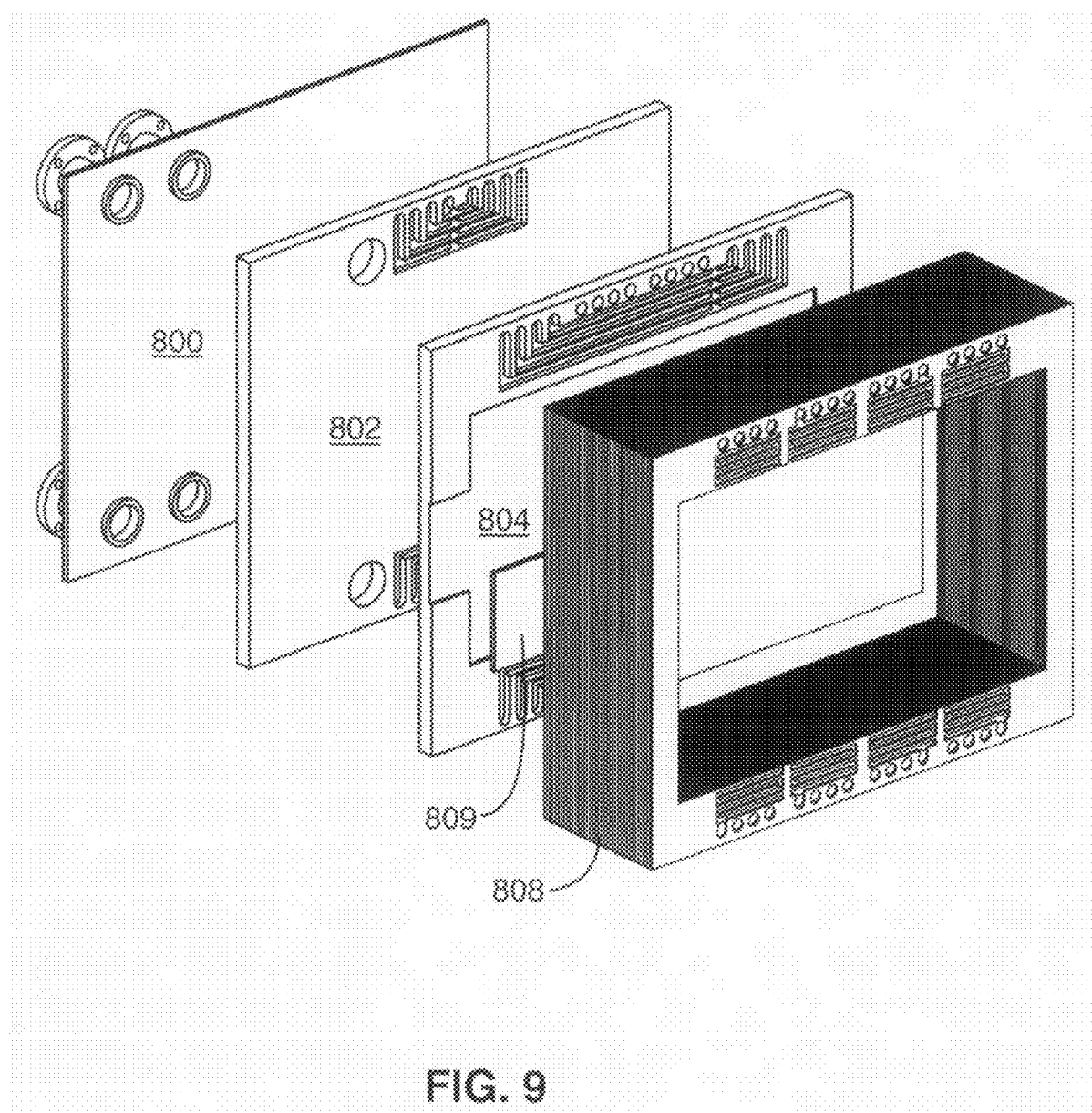
FIG. 9 is a perspective view of a portion of an embodiment of an electrochemical energy storage system.

Referring to FIG. 9, an inside perspective view of the manifold cover plate 800, outer manifold plate 802, inner manifold plate 804, current collector pad 806, and sub-stack 808 of FIG. 8 is shown.

Figure 10:
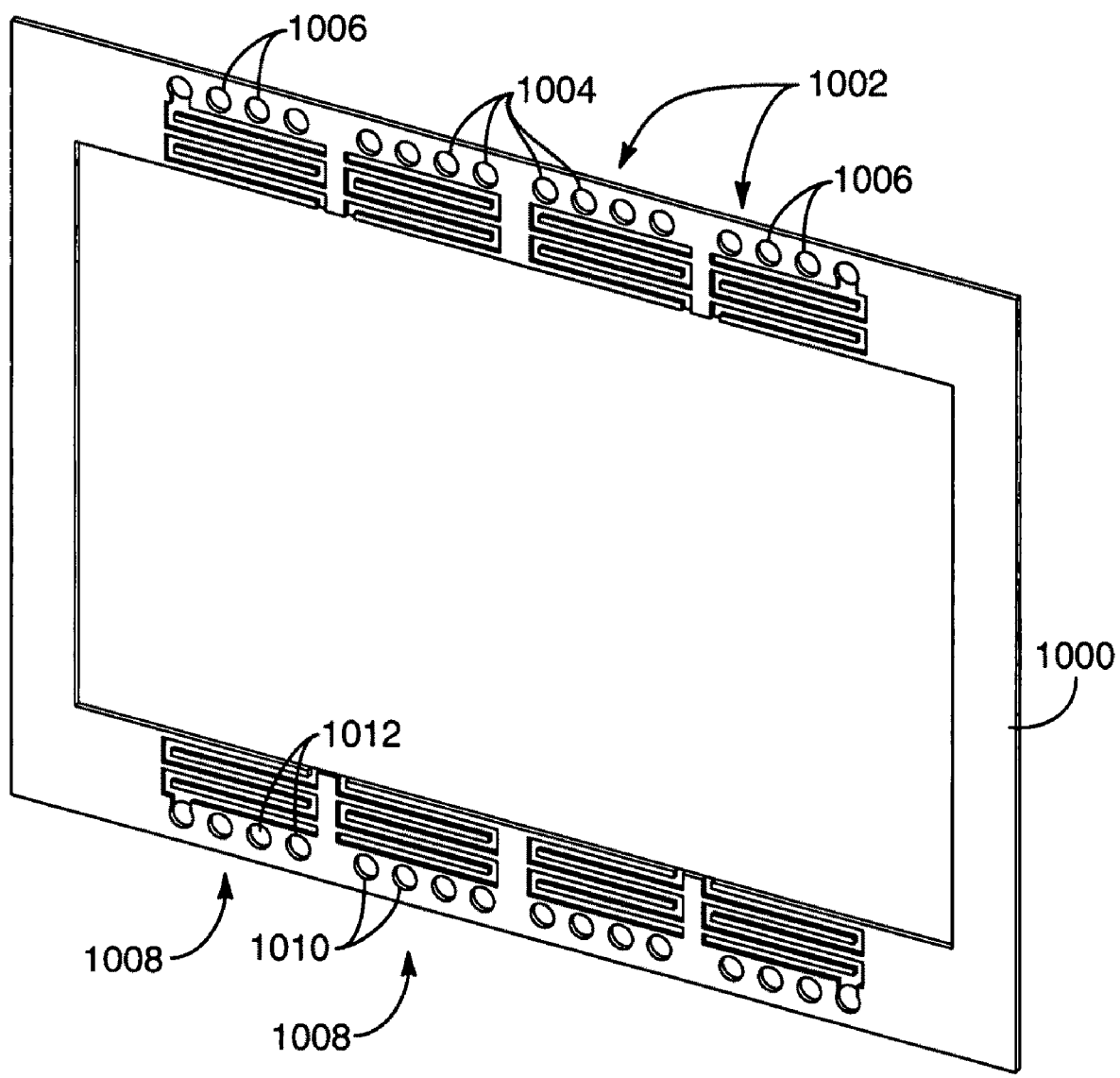
FIG. 10 is a perspective view of an embodiment of a cell frame.

Referring to FIG. 10, a perspective view of one embodiment of a cell frame 1000 is shown. Each sub-stack includes a plurality of cells, and each cell may be embodied with two cell frames, a positive frame and a negative frame. The positive frame is configured to provide a positive electrolyte solution flow path. The negative frame is configured to provide a negative electrolyte solution flow path. A flow path provides both an inlet and outlet of solution to a desired compartment.

The cell frame 1000 includes supply channel apertures 1002 including positive supply channel apertures 1004 and negative supply channel apertures 1006. The cell frame 1000 also includes return channel apertures 1008 including positive return channel apertures 1010 and negative return channel apertures 1012. The channel apertures 1002, 1006 are aligned with channel apertures in adjacent cell frames to form supply and return channels to each cell.

In the disclosed embodiment, each cell frame 1000 provides an inlet for two supply channel apertures and an outlet for two return channel apertures. The inlet allows solution to flow from a supply channel aperture into a compartment. An outlet allows solution to exit from a compartment to a return channel aperture to thereby create a flow path.

Figure 11:
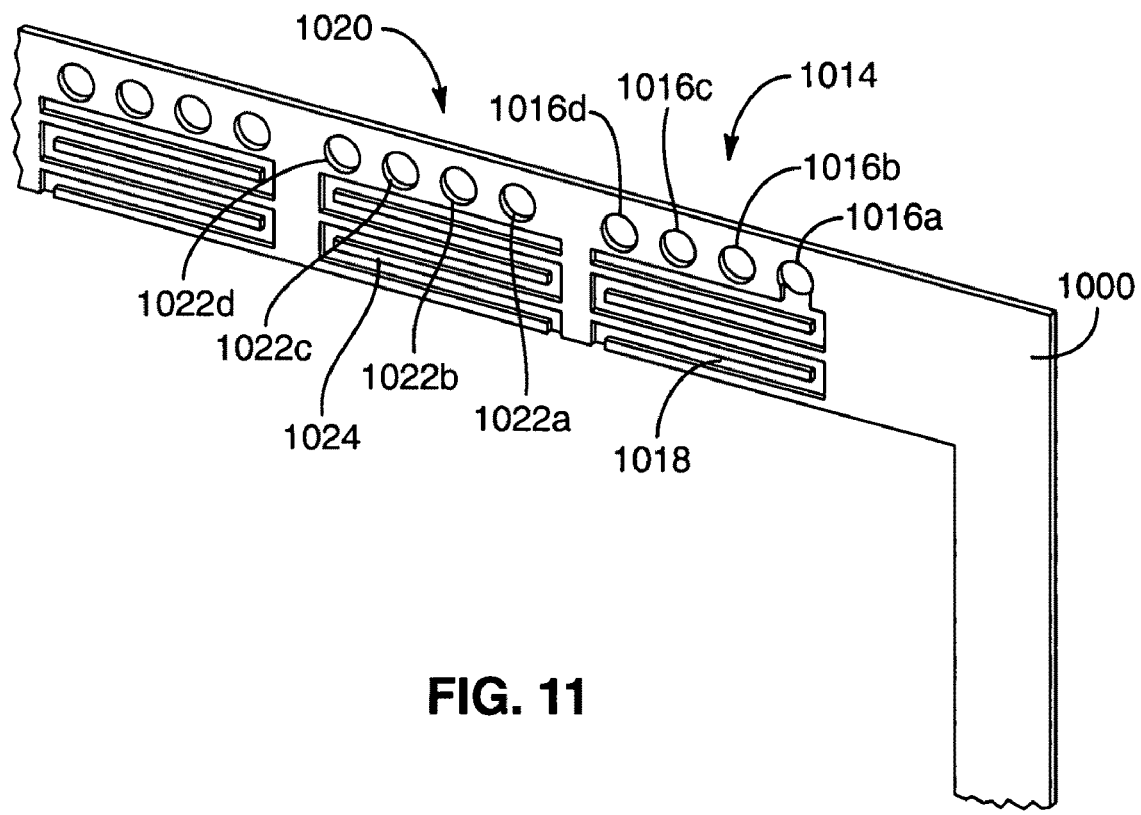
FIG. 11 is a perspective view of a portion of the cell frame of FIG. 10.

Referring to FIG. 11, a perspective view of a portion of the cell frame 1000 of FIG. 10 is shown. The cell frame 1000 is configured with a group 1014 of negative supply channel apertures 1016a-d. The negative supply channel aperture 1016a is in communication with an inlet 1018. The inlet 1018 is further in fluid communication with a negative compartment which may be separated from a positive compartment by a membrane as discussed above.

Although not shown, a mirroring group of negative supply channel apertures may be disposed on an opposing side of the cell frame with an aperture of the group in communication with a negative compartment.

The remaining negative supply channel apertures 1016b-d do not communicate with an inlet. Rather, the negative supply channel apertures 1016b-d convey electrolyte solution to cells in subsequent sub-stacks.

The cell frame 1000 includes a group 1020 of positive supply channel apertures 1022a-d that convey electrolyte solution to the cells. For a negative cell frame, the positive supply channel apertures 1022a-d are not in communication with an inlet. The negative cell frame 1000 may nevertheless include a partial inlet 1024 disposed adjacent the positive supply channel apertures 1022a-d. The partial inlet 1024 is provided to facilitate manufacturing. In manufacturing, a mold may include partial inlets adjacent all apertures for all cell frames. Any partial inlet may then be formed into a full inlet by removing material. In this manner, cell frames with the desired fluid communication may be formed from a single mold. In a similar manner, partial and full outlets for communication with return channel apertures may be formed.

Negative cell frames in a first sub-stack may all be identically embodied as the cell frame 1000. Thus, if a first sub-stack includes 25 cells, the 25 negative frames in the first sub-stack are all configured such that the same negative supply channel apertures communicate with corresponding inlets. In this manner, a negative supply channel is provided to all cells in a sub-stack.

Figure 12:
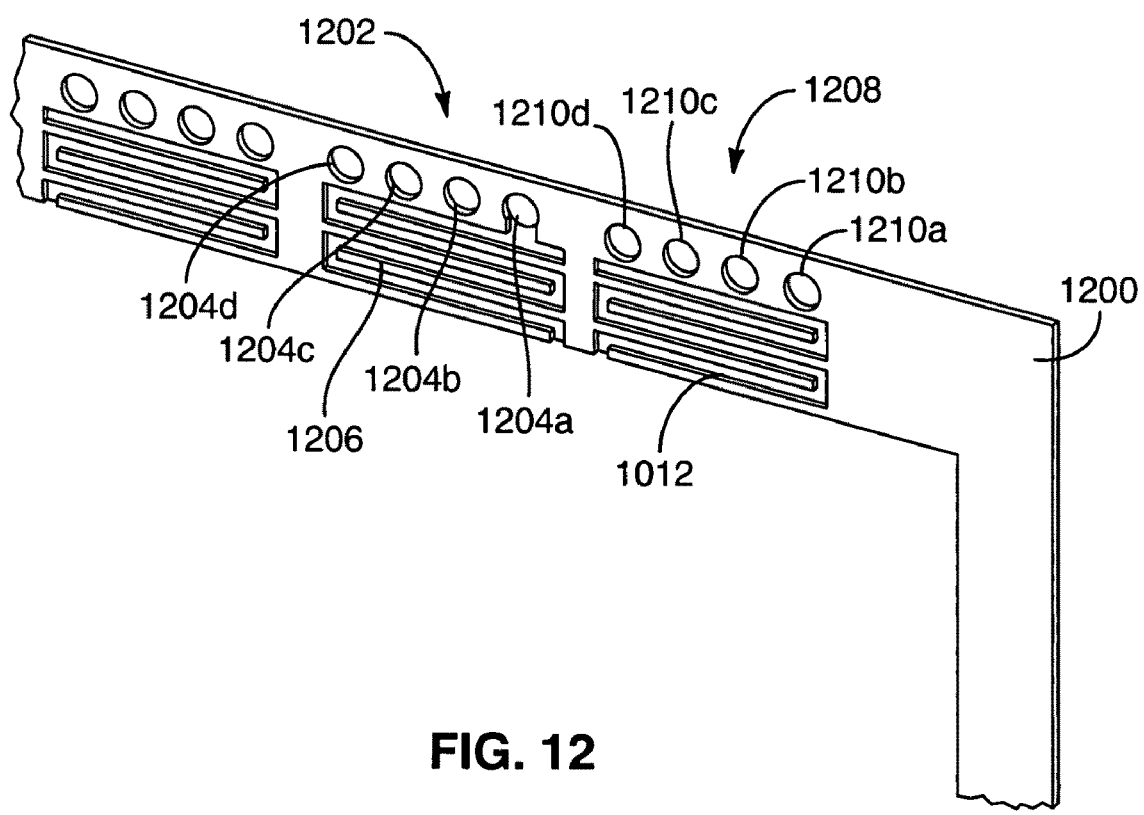
FIG. 12 is a perspective view of a portion of an alternative embodiment of a cell frame.

Referring to FIG. 12, a perspective view of a portion of a cell frame 1200 is shown. The cell frame 1200 is configured with a group 1202 of positive supply channel apertures 1204a-d. A positive supply channel aperture 1204a is in communication with an inlet 1206. The remaining positive supply channel apertures 1204b-d are not in communication with the inlet 1206 and convey electrolyte solution to cells in other sub-stacks. The cell frame 1200 is a positive cell frame, as it is configured to provide positive solution to a positive compartment of a cell. As such, the inlet 1206 is in fluid communication with a positive compartment. A mirroring positive supply channel aperture may also be in communication with an inlet on an opposing side of the cell frame 1200.

Positive cell frames in the same sub-stack, such as the first sub-stack, may all be identically embodied as the cell frame 1200. All positive cell frames in the same sub-stack are all configured such that the same positive supply channel apertures communicate with corresponding inlets. The combination of positive supply channel apertures forms a positive supply channel to all cells in a sub-stack. The positive supply channel apertures that are not in communication with inlets provide a positive supply channel to another sub-stack of cells.

A group 1208 of negative supply channel apertures 1210a-d conveys electrolyte solution to negative compartments in the cells. A partial inlet 1212 may be formed in the cell frame based on manufacturing design.

FIGS. 11 and 12 have discussed negative and positive supply channel apertures. Negative and positive return channel apertures are similarly disposed in the cell frames and may mirror the supply channel apertures. The return channel apertures disposed may be disposed on opposing sides of a cell frame to accommodate positive and negative compartments. This facilitates flow paths through the positive and negative compartments.

Figure 13:
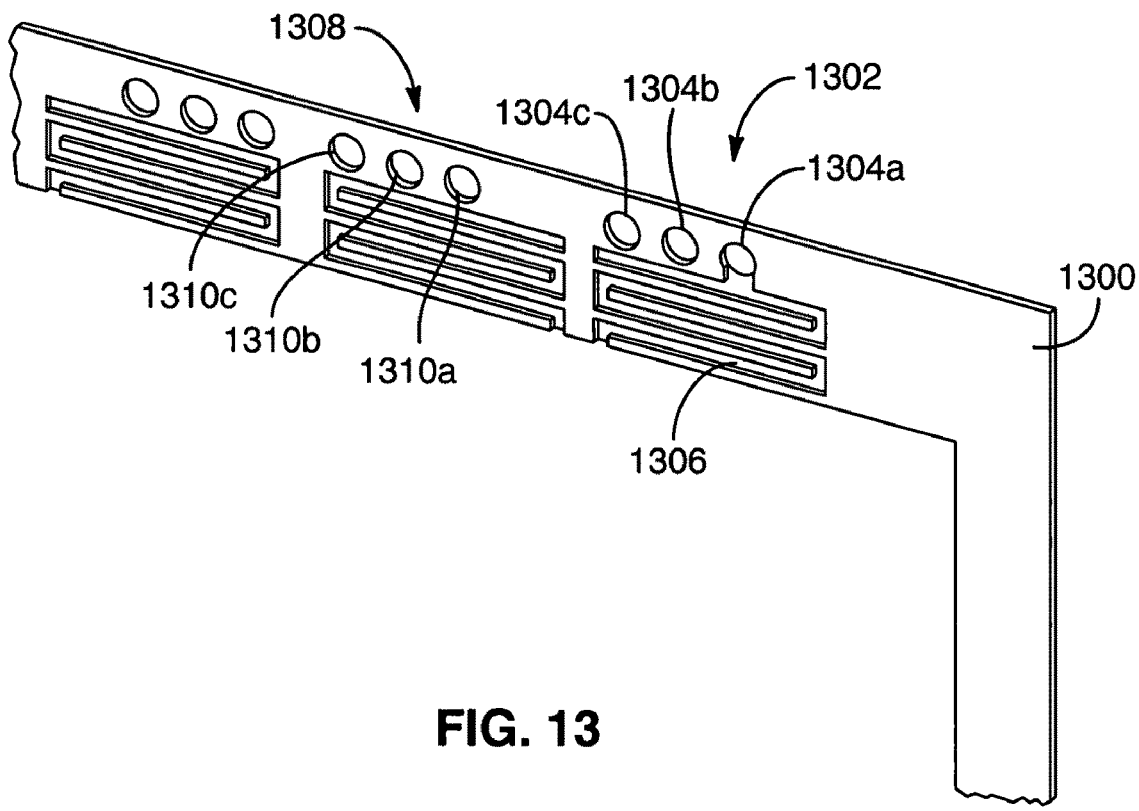
FIG. 13 is a perspective view of a portion of an alternative embodiment of a cell frame.

Referring to FIG. 13, a perspective view of an embodiment of a negative cell frame 1300 is shown. The negative cell frame 1300 is incorporated within a second sub-stack of an electrochemical battery. The negative cell frame 1300 has a group 1302 of three negative supply channel apertures 1304a-c rather than four as shown in the negative cell frame 1000 of FIGS. 10 and 11. This is because the negative supply channel is used for the first sub-stack and does not extend into the second sub-stack. The negative cell frame 1300 may also include another group of three negative supply channel apertures.

One of the negative supply channel apertures 1304a is used to supply electrolyte solution to the cells of the second sub-stack. The negative supply channel aperture 1304a is in communication with an inlet 1306 to supply fluid to a negative compartment. The remaining two negative supply channel apertures 1304b,c convey electrolyte solution to third and fourth sub-stacks. The negative cell frame 1300 further includes a group of 1308 of three positive supply channel apertures 1310a-c. The positive supply channel aperture 1310a supplies positive electrolyte solution to cells in the second sub-stack. The two remaining positive supply channel apertures 1310b,c supply positive electrolyte solution to the cells in the third and fourth sub-stacks.

Figure 14:
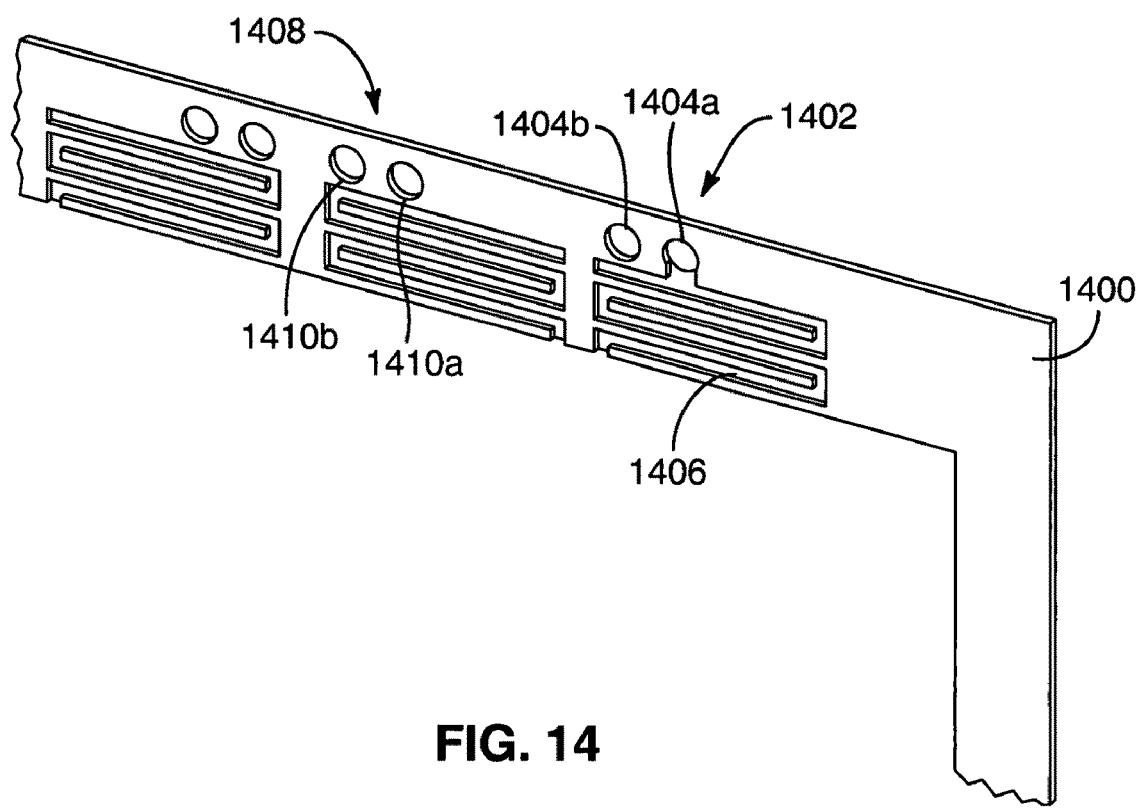
FIG. 14 is a perspective view of a portion of an alternative embodiment of a cell frame.

Referring to FIG. 14, a perspective view of an embodiment of a negative cell frame 1400 is shown. The negative cell frame 1400 is incorporated within a third sub-stack of an electrochemical battery. The negative cell frame 1400 has a group 1402 of two negative supply channel apertures 1404a,b rather than three or four as shown in the previous negative cell frames. This is because the negative supply channel used for the first and second sub-stacks does not extend into the third sub-stack. The negative cell frame 1400 may also include another group of two negative supply channel apertures.

One of the negative supply channel apertures 1404a is used to supply electrolyte solution to the cells of the second sub-stack. The negative supply channel aperture 1404a is in communication with an inlet 1406 to supply fluid to a negative compartment. The remaining negative supply channel aperture 1404b conveys electrolyte solution to fourth sub-stack. The negative cell frame 1400 further includes a group of 1408 of two positive supply channel apertures 1410a,b. The positive supply channel aperture 1410a supplies positive electrolyte solution to cells in the third sub-stack. The remaining positive supply channel aperture 1410b supplies positive electrolyte solution to the cells in the fourth sub-stack.

Figure 15:
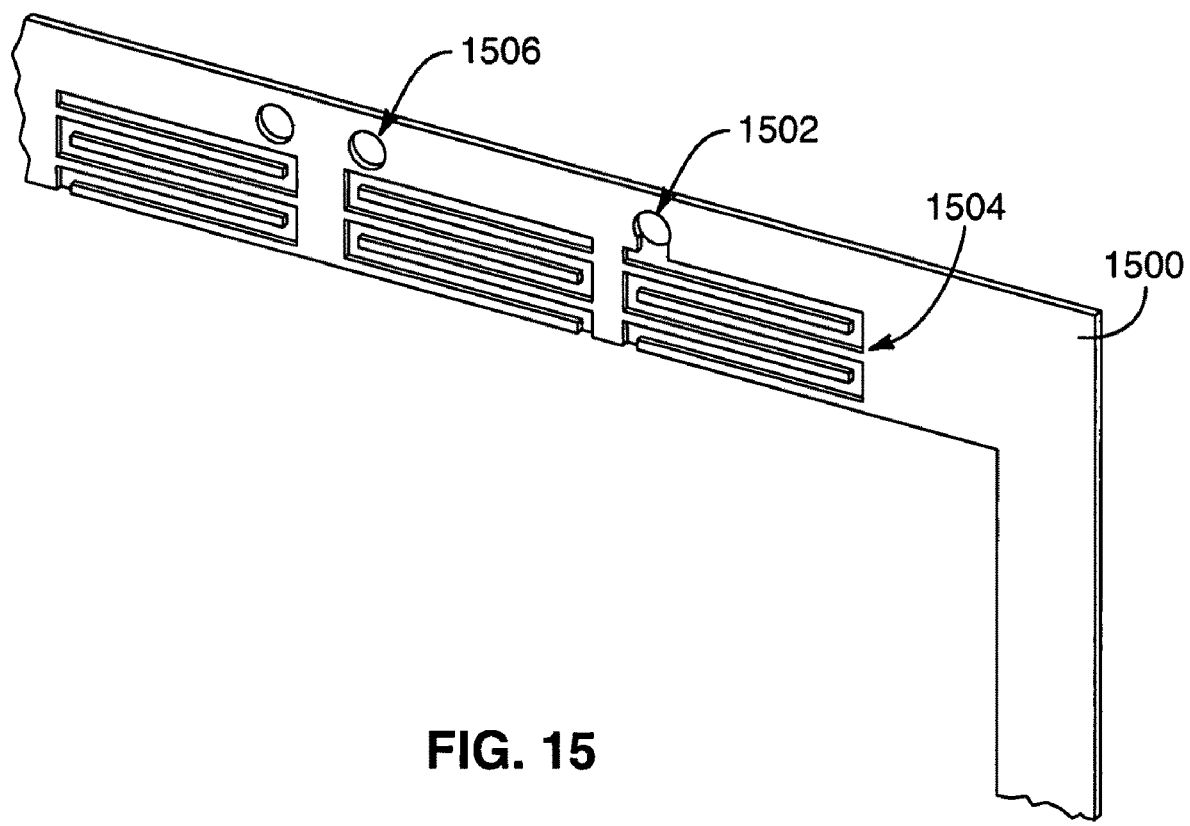
FIG. 15 is a perspective view of a portion of an alternative embodiment of a cell frame.

Referring to FIG. 15, a perspective view of an embodiment of a negative cell frame 1500 is shown. The negative cell frame 1500 is incorporated within a fourth sub-stack of an electrochemical battery. The negative cell frame 1500 has a negative supply channel aperture 1502 rather than two, three, or four as shown in the previous negative cell frames. This is because the negative supply channel used for the first, second, and third sub-stacks does not extend into the fourth sub-stack. The negative cell frame 1500 may also include another negative supply channel aperture if another negative supply channel is desired to convey negative solution to the fourth sub-stack.

The negative supply channel aperture 1502 is in communication with an inlet 1504 to supply fluid to a negative compartment. The negative cell frame 1500 further includes a positive supply channel aperture 1506. The positive supply channel aperture 1506 supplies positive electrolyte solution to cells in the fourth sub-stack. This is accomplished through the use of a positive cell frame which may be embodied in a manner similar to the negative cell frame.

FIGS. 10, 11, and 13-15 are directed to a negative cell frame and have focused on negative electrolyte supply. One of skill in the art will appreciate that the negative return channels and apertures may be similarly embodied. Furthermore, the positive cell frames may be embodied similar to the negative cell frames to provide parallel supply channels to a series of sub-stacks. As such, positive cell frames in a subsequent sub-stack form a reduced number of positive supply and return channels than positive cell frames in a previous sub-stack. Furthermore, positive cell frames may have positive return channels similarly embodied. Thus, the negative cell frames of FIGS. 10, 11, and 13-15 should be considered exemplary of positive cell frames as well.

Figure 16:
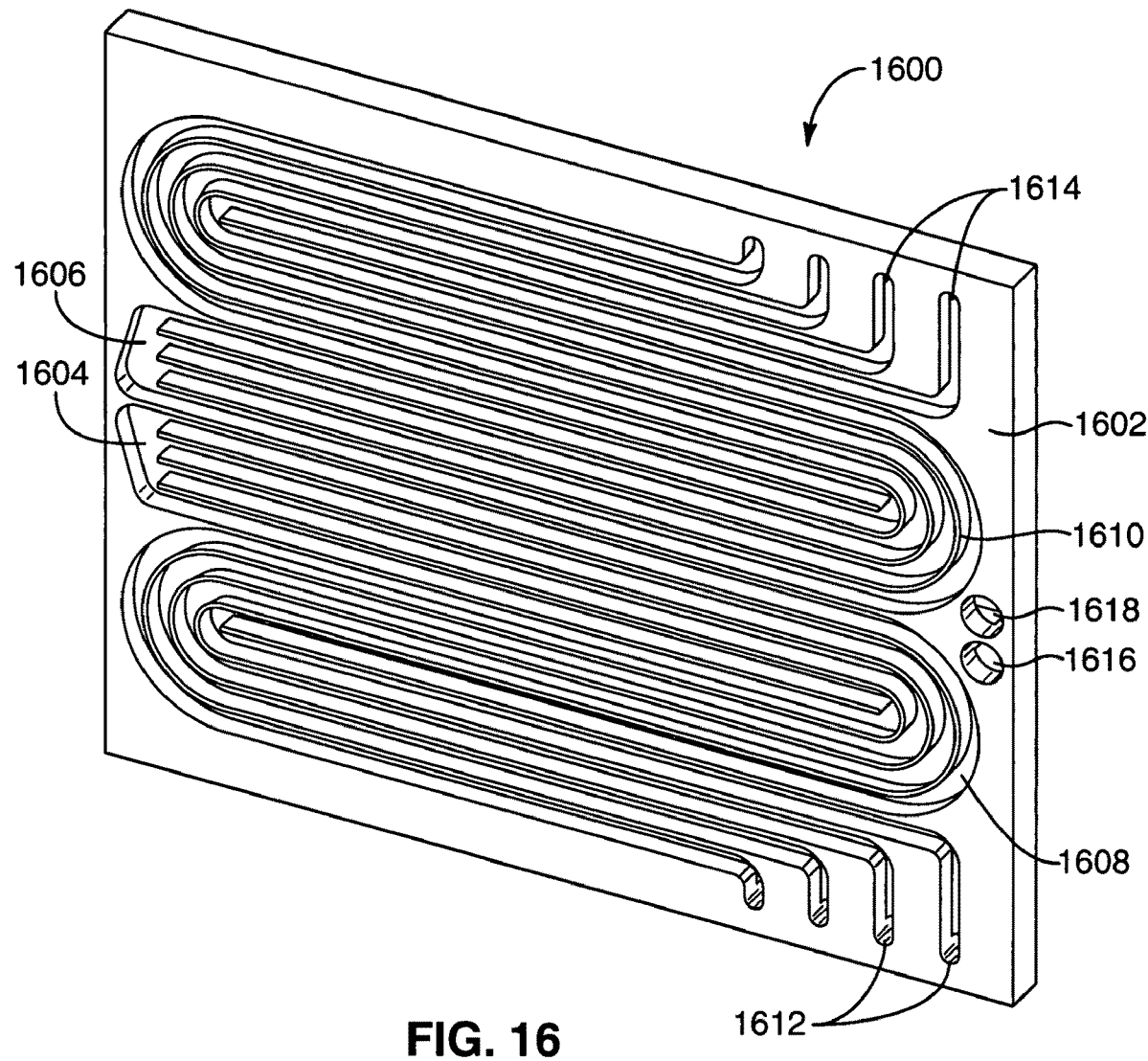
FIG. 16 is a perspective view of the outer side of an embodiment of a double-sided single port manifold.

Referring to FIG. 16, an embodiment of a double-sided single port manifold plate 1600 is shown. In particular, an outer side 1602 of the manifold plate 1600 is shown. The plate is double-sided in that both sides provide wells and shunt passages. The plate 1600 is defined as being a single port as it is configured to provide a single outlet and inlet to each cell frame. The outer side 1602 may be discussed as supplying and returning a positive solution whereas an inner side supplies and returns a negative solution. However, one of skill in the art will appreciate that this arrangement may be reversed so that the inner side supplies and returns a positive solution and the outer side supplies and returns a negative solution.

The outer side 1602 includes an input well 1604 to receive a positive solution and an output well 1606 to return the positive solution. The input well 1604 is in communication with one or more supply shunt passages 1608. Similarly, the output well 1606 is in communication with one or more return shunt passages 1610. The shunt passages 1608, 1610 may be configured as extended serpentine paths that run parallel to one another to maximize their length. As shown, the shunt passages 1608, 1610 may approximate an S-shape. The supply shunt passages 1608 may also be configured as a mirror image of the return shunt passages 1610. In one embodiment, there are four supply shunt passages 1608 and four return shunt passages 1610.

Each supply shunt passage 1608 extends from the input well 1604 and terminates at a corresponding supply aperture 1612. Likewise, each return shunt passage 1610 extends from the output well 1606 and ends at a corresponding return aperture 1614. The supply and return apertures 1612, 1614 extend through the plate 1600 and communicate with individual cell frames in the stack. Each cell frame communicates with one supply aperture 1612 and one return aperture 1614. Accordingly, the single port manifold plate 1600 is configured to communicate with a single inlet and outlet for each cell frame.

The manifold plate 1600 further includes input and output apertures 1616, 1618 to provide solution to and from the inner side. Accordingly, each aperture 1616, 1618 extends through the plate 1600 and is appropriately sized to accommodate the required solution volume.

Figure 17:
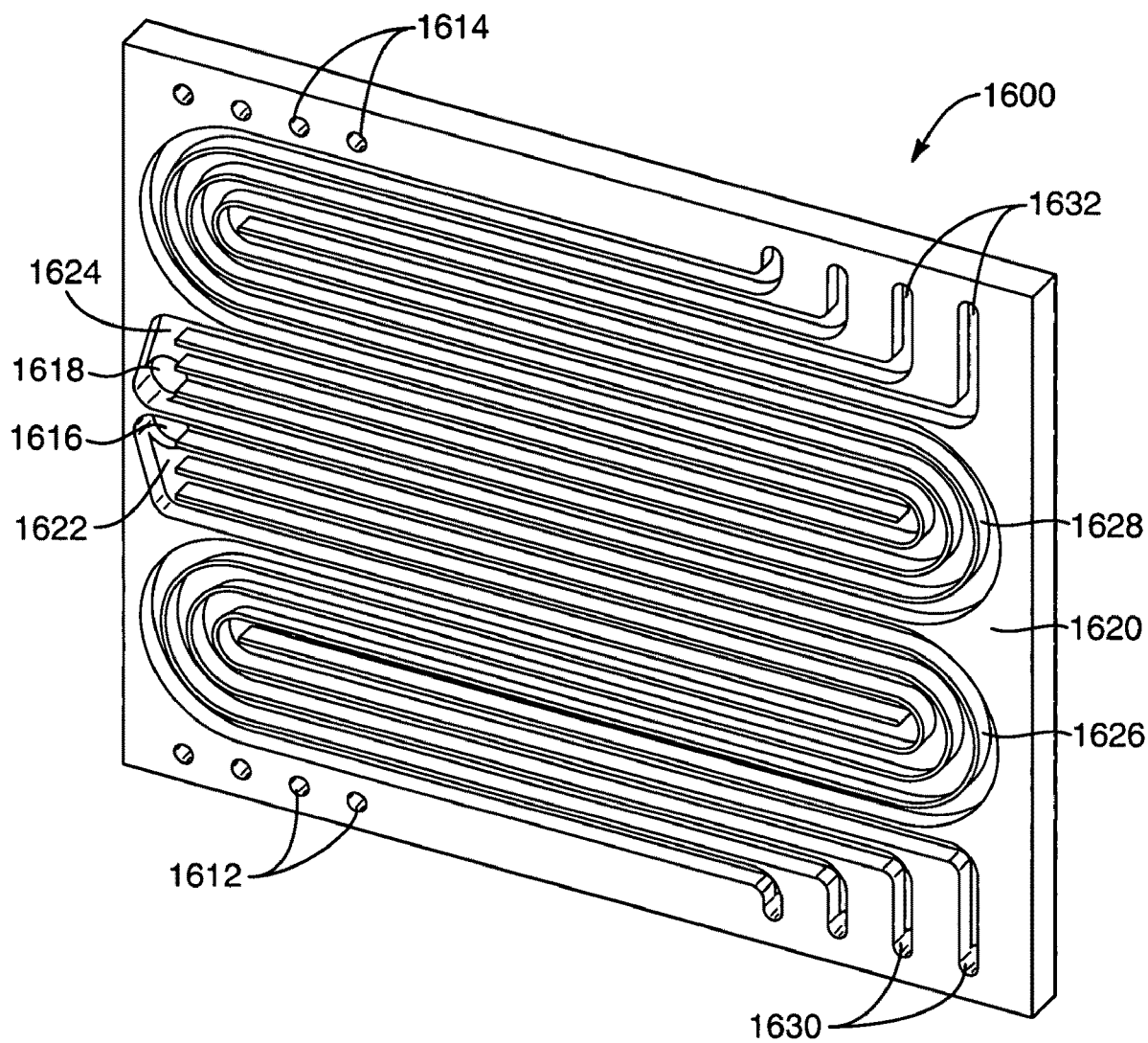
FIG. 17 is a perspective view of the inner side of the manifold of FIG. 16.

Referring to FIG. 17, an inner side 1620 of the plate 1600 of FIG. 16 is shown. The input aperture 1616 communicates with an input well 1622 and the output aperture 1618 communicates with an output well 1624. The input well 1622 communicates with supply shunt passages 1626 and the output well 1624 communicates with return shunt passages 1628 in a manner similar to that of the outer plate 1602. The supply and return shunt passages 1626, 1628 may be embodied similar to the shunt passages 1608, 1610. Rather than communicating with supply and return apertures, the supply and return shunt passages 1626, 1628 terminate at corresponding supply and return ends 1630, 1632. Each supply and return end 1630, 1632 is aligned to communicate with cell frames arranged in the stack. The supply and return apertures 1612, 1614 are shown extending through the plate 1600 and communicate with the appropriate cell frame. The positive and negative cell frames communicate with the appropriate supply or return shunt passages of either the outer or inner sides 1602, 1620. The communication depends on whether the outer or inner side is providing positive or negative solution.

The manifold plate 1600 eliminates the need for two manifold plates by providing shunt passages on both sides. The four supply and return apertures 1612, 1614 provide positive solution to four different sub-stack groupings of positive cell frames. Each cell frame has an inlet and an outlet that communicate with corresponding supply and return apertures 1612, 1614. The configuration may be similar for the four supply and return ends 1630, 1632 which provide negative solution to negative cell frames.

Figure 18:
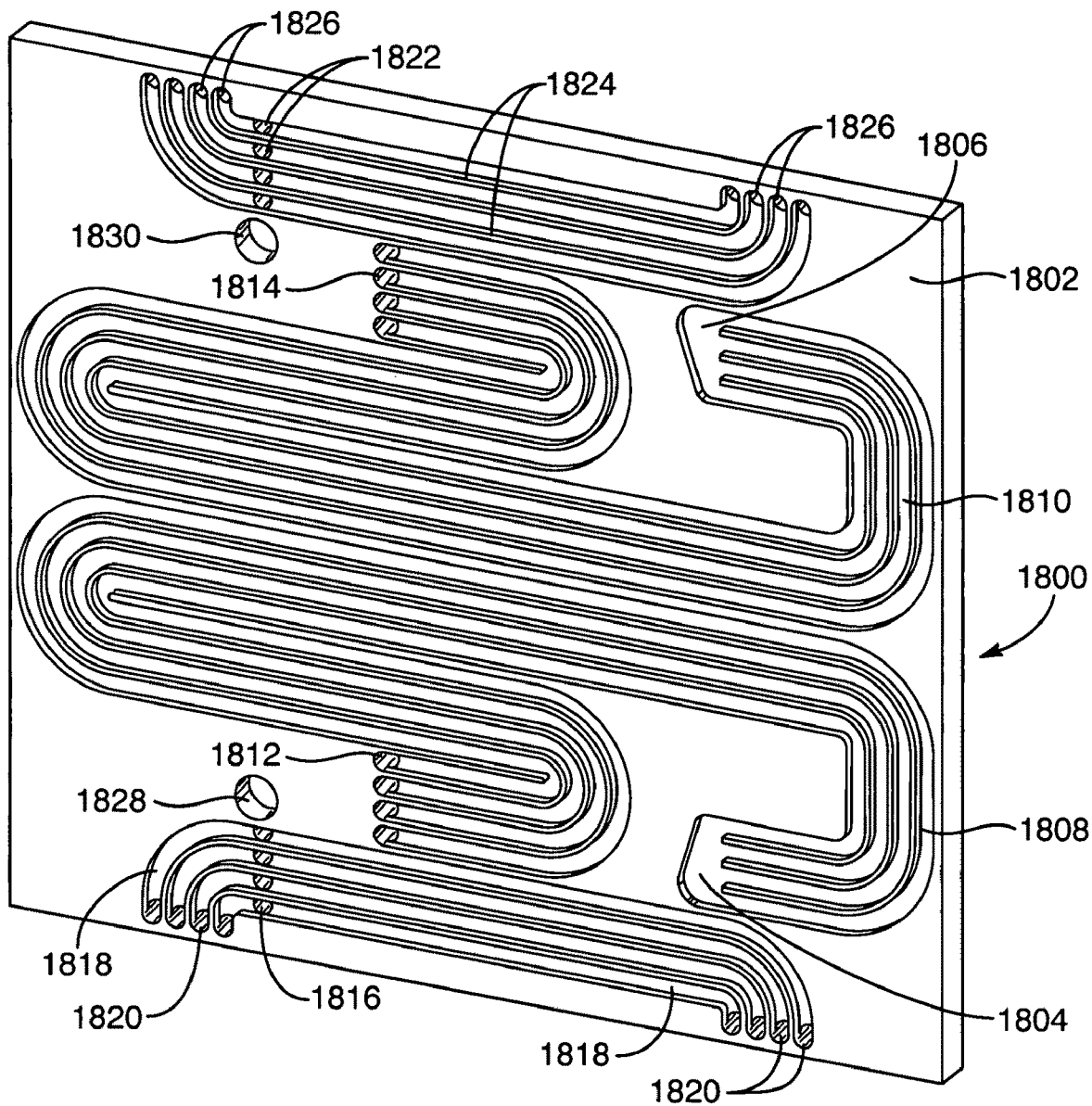
FIG. 18 is a perspective view of the outer side of an embodiment of a double-sided dual port manifold.

Referring to FIG. 18, an alternative embodiment of a manifold plate 1800 is shown. The manifold plate 1800 is a double-sided plate as it provides wells and shunt passages on both sides. Furthermore, the manifold plate 1800 is configured as a dual port as it provides two supply and return communications for each cell frame. FIG. 18 illustrates the outer side 1802 of the manifold plate 1800 which, for illustrative purposes, is discussed herein as supplying and returning a negative electrolyte solution. The outer side 1802 may also be configured to supply and return a positive electrolyte solution as well. The outer side 1802 includes an input well 1804 to supply negative solution and an output well 1806 to return negative solution.

The input well 1804 is in communication with one or more supply shunt passages 1808 which may be configured as serpentine paths to maximize the length. Similarly, the output well 1806 is in communication with one or more return shunt passages 1810 that are embodied similar to the supply shunt passages 1808. As illustrated, the return shunt passages 1810 may mirror the supply shunt passages 1808. Each supply shunt passage 1808 extends to a corresponding outer supply aperture 1812 and each return shunt passage 1810 extends to a corresponding outer return aperture 1814. The outer supply and return apertures 1812, 1814 extend through the plate 1800 to enable communication with cell frames. The supply and return apertures 1812, 1814 are identified as being "outer" as the wells 1804, 1806 with which they communicate are disposed on the outer side 1802.

The manifold plate 1800 further includes inner supply apertures 1816 which extend through the manifold plate 1800. The term "inner" is used to designate that the supply apertures 1816 are in communication with wells on the inner side of the manifold plate. The inner supply apertures 1816 may be disposed in proximity to one another and provide distribution of the positive solution. The inner supply apertures 1816 are each in communication with one or more supply channels 1818. Each inner supply aperture 1816 is shown as communicating with two supply channels 1818. This is to enable communication with two inlets of the corresponding cell frames. Each supply channel 1818 may be disposed in parallel with other supply channels. Furthermore, each supply channel 1818 extends from an inner supply aperture 1816 to a corresponding second inner supply aperture 1820. The second inner supply apertures 1820 extend through the manifold plate 1800 and provide communication with the corresponding cell frames.

The manifold plate 1800 also includes inner return apertures 1822 which extend through the manifold plate 1800. Once again, the term "inner" is used to designate that the return apertures 1822 are in communication with wells on the inner side of the manifold plate 1800. The inner return apertures 1822 may be disposed in proximity to one another and convey the solution from corresponding cell frames. The inner return apertures 1822 are each in communication with one or more return channels 1824. Each inner return aperture 1822 is shown as communicating with two return channels 1824. This is to enable communication with two inlets of the corresponding cell frames. One of skill in the art will appreciate that the number of channels corresponding to each aperture may vary by design.

Each return channel 1824 may be disposed in parallel with return channels. Furthermore, each return channel 1824 extends from an inner return aperture 1816 to a corresponding second inner return aperture 1826. The second inner return apertures 1826 extend through the manifold plate 1800 and provide communication with the cell frames.

The manifold plate 1800 further includes an input aperture 1828 and an output aperture 1830. The apertures 1828, 1830 extend through the manifold plate 1800 and supply and return solution to the inner side. The apertures 1828, 1830 may be embodied similar to those discussed above.

Figure 19:
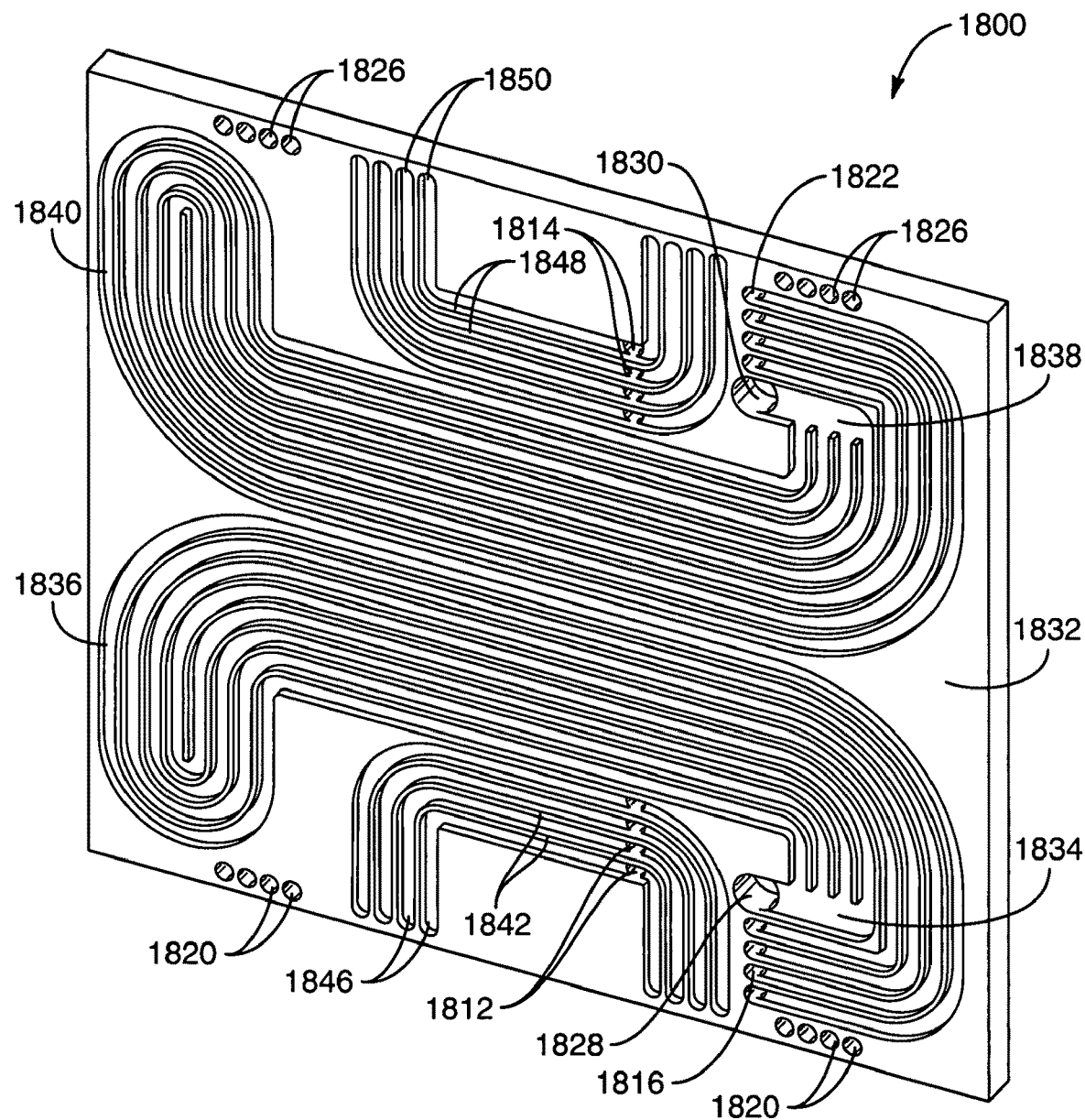
FIG. 19 is a perspective view of the inner side of the manifold of FIG. 18.

Referring to FIG. 19, an embodiment of the inner side 1832 of the manifold plate 1800 of FIG. 18 is shown. The input aperture 1828 extends through the manifold plate 1800 and communicates with an inner input well 1834. The inner input well 1834 further communicates with a plurality of inner supply shunt passages 1836 that may be embodied similar to those discussed above.

The inner supply shunt passages 1836 extend across the inner side 1832 and each terminate at corresponding inner supply apertures 1816. As discussed above, the inner supply apertures 1816 extend through the manifold plate 1800 and communicate with supply channels 1818 on the outer side 1802. Each supply channel 1818 further communicates with a corresponding second inner supply aperture 1820. Each second inner supply aperture 1820 extends through the manifold plate 1800 and may be placed in communication with corresponding cell frames.

The output aperture 1830 extends through the manifold plate 1800 and communicates with an inner output well 1838. The inner output well 1838 further communicates with a plurality of inner return shunt passages 1840 that may be embodied similar to those discussed above. The inner return shunt passages 1840 extend across the inner side 1832 and each terminate at corresponding inner return apertures 1822. The inner return apertures 1822 extend through the manifold plate 1800 and communicate with return channels 1824 on the outer side 1802. Each return channel 1824 further communicates with a corresponding second inner return aperture 1826. Each second inner return aperture 1826 extends through the manifold plate 1800 and may be placed in communication with corresponding cell frames.

The inner side 1832 further includes supply channels 1842 that communicate with the outer supply apertures 1812. As shown, each outer supply aperture 1812 communicates with two supply channels 1842 to thereby communicate with two inlets of each corresponding cell frame. Each supply channel 1842 extends from a corresponding outer supply aperture 1812 and terminates at a corresponding supply channel end 1846. The ends 1846 then communicate with the appropriate cell frames.

The inner side 1832 also includes return channels 1848 that communicate with the outer return apertures 1814. As shown, each outer return aperture 1814 communicates with two return channels 1848 to thereby communicate with two outlets of each corresponding cell frame. Each return channel 1848 extends from a corresponding outer return aperture 1814 and terminates at a corresponding return channel end 1850. The return channel ends 1850 then communicate with the appropriate cell frames.

As can be appreciated by one of skill in the art, the number of inlets and outlets for each cell frame serviced by the manifold may vary. Increasing the number of inlets and outlets for each cell creates a more complex manifold design. The double-sided manifold plates shown in FIGS. 16 through 19 provide cell frame communication for both positive and negative solution from one side. For example, the cell frames communicate with the inner sides 1620, 1832. In the embodiment of FIGS. 16 and 17 solution originating in outer side wells 1604, 1606 is passed to the inner side 1620 through the apertures 1612, 1614.

In the embodiment of FIGS. 18 and 19, solution originating in outer side wells 1804, 1806 is passed to the inner side 1832 through apertures 1812, 1814. The double-sided, dual port embodiment of FIGS. 18 and 19 provides the added feature of passing solution originating in inner wells 1834, 1838 to the outer side 1802 through apertures 1816, 1822 and then back to the inner side 1832 through apertures 1820, 1826. Although the discussed supply and return channels provide some shunt capability, the majority of the shunt length occurs in the supply and return shunt passages.

As disclosed herein, manifold plates are disposed at one end of a battery cell stack and all electrolyte connections are coupled to the manifold plates. Although the outer manifold plate and the inner manifold plate have been discussed in reference to positive electrolyte and negative electrolyte solutions respectively, it will be appreciated that the manifold plates may be used interchangeably to distribute either solution. Furthermore, the location of apertures, wells, and channels in the manifold plates may vary by design. The manifold plates include serpentine shunt passages to increase resistance. Electrolyte flows to different parts of the stack using separate, parallel channels. The supply and return channels are formed into or let out of individual cell frames.

It will be obvious to those having skill in the art that many changes may be made to the details of the above-described embodiments without departing from the underlying principles of the invention. Therefore, the scope of the present invention should be determined only by the following claims.

The invention claimed is:

1. An electrochemical battery, comprising: a plurality of cells, each cell including negative and positive compartments to hold electrolyte solution;
    an outer manifold plate, comprising,
        supply shunt passages to convey electrolyte solution to the cells, and
        return shunt passages to receive electrolyte solution from the cells; and
    an inner manifold plate coupled to the outer manifold plate and comprising,
        supply shunt passages to convey electrolyte solution to the cells, and
        return shunt passages to receive electrolyte solution from the cells;
    wherein the supply and return shunt passages of the outer and inner manifold plates are configured to form serpentine paths.

2. The electrochemical battery of claim 1, wherein the supply shunt passages of the outer and inner manifold plates are configured to form parallel paths and the return shunt passages of the outer and inner manifold plates are configured to form parallel paths.

3. The electrochemical battery of claim 1, wherein the outer manifold plate comprises:
    an input well in communication with the supply shunt passages; and
    an output well in communication with the return shunt passages.

4. The electrochemical battery of claim 3, wherein the outer manifold plate comprises:
    an input aperture to enable communication with the inner manifold plate; and
    an output aperture to enable communication with the inner manifold plate.

5. The electrochemical battery of claim 4, wherein the inner manifold plate comprises:
    an input well in communication with the supply shunt passages of the inner manifold plate and the input aperture of the outer manifold plate; and
    an output well in communication with the return shunt passages of the inner manifold plate and the output aperture of the outer manifold plate.

6. The electrochemical battery of claim 5, further comprising a manifold cover plate coupled to the outer manifold plate and comprising:
    a positive input in communication with the input well of the outer manifold plate;
    a negative input in communication with the input well of the inner manifold plate through the input aperture of the outer manifold plate;
    a positive output in communication with the output well of the outer manifold plate; and
    a negative output in communication with the output well of the inner manifold plate through the output aperture of the outer manifold plate.

7. The electrochemical battery of claim 1, wherein the outer manifold comprises:
    supply apertures extending through the outer manifold plate, each supply aperture in communication with a corresponding supply shunt passage; and
    return apertures extending through the outer manifold plate, each return aperture in communication with a corresponding return shunt passage.

8. The electrochemical battery of claim 7, wherein the outer manifold comprises:
    supply channels, each supply channel in communication with a corresponding supply aperture; and
    return channels, each return channel in communication with a corresponding return aperture.

9. The electrochemical battery of claim 8, wherein the inner manifold comprises:
    supply channel apertures extending through the inner manifold plate, each supply channel aperture in communication with a corresponding supply channel of the outer manifold plate; and
    return channel apertures extending through the inner manifold plate, each return channel aperture in communication with a corresponding return channel of the outer manifold plate.

10. The electrochemical battery of claim 1, wherein the inner manifold plate comprises:
    supply apertures extending through the inner manifold plate, each supply aperture in communication with a corresponding supply shunt passage; and
    return apertures extending through the inner manifold plate, each return aperture in communication with a corresponding return shunt passage.

11. The electrochemical battery of claim 10, wherein the inner manifold further comprises:
    supply channels, each supply channel in communication with a corresponding supply aperture; and
    return channels, each return channel in communication with a corresponding return aperture.

12. The electrochemical battery of claim 1, further comprising:

a first sub-stack comprising a plurality of cells, wherein each cell includes a cell frame, each cell frame including,
  a first positive supply channel aperture in communication with the outer manifold plate,
  a first positive return channel aperture in communication with the outer manifold plate,
  a first negative supply channel aperture in communication with the inner manifold plate,
  a first negative return channel aperture in communication with the inner manifold plate,
  a second positive supply channel aperture in communication with the outer manifold plate,
  a second positive return channel aperture in communication with the outer manifold plate,
  a second negative supply channel in communication with the inner manifold plate,
  a second negative return channel in communication with the inner manifold plate,
a second sub-stack comprising a plurality of cells, wherein each cell includes a cell frame, each cell frame including,
  a positive supply channel aperture in communication with the outer manifold plate and the second positive supply channel apertures of the first sub-stack,
  a positive return channel aperture in communication with the outer manifold plate and the second positive return channel apertures of the first sub-stack,
  a negative supply channel aperture in communication with the inner manifold plate and the second negative supply channel apertures of the first sub-stack, and
  a negative return channel aperture in communication with the inner manifold plate and the second negative return channel apertures of the first sub-stack.

13. The electrochemical battery of claim 1, further comprising:
a first sub-stack comprising,
  a plurality of cells,
  a first positive supply channel to convey electrolyte solution to the cells of the first sub-stack,
  a first negative supply channel to convey electrolyte solution to the cells of the first sub-stack,
  a first positive return channel to return electrolyte solution from the cells of the first sub-stack,
  a first negative return channel to return electrolyte solution from the cells of the first sub-stack,
  a second positive supply channel,
  a second negative supply channel,
  a second positive return channel,
  a second negative return channel; and
a second sub-stack comprising,
  a plurality of cells,
  a positive supply channel in communication with the second positive supply channel of the first sub-stack,
  a negative supply channel in communication with the second negative supply channel of the second sub-stack,
  a positive return channel in communication with the second positive return channel of the first sub-stack, and
  a negative return channel in communication with the second negative return channel of the first sub-stack.

14. An electrochemical battery, comprising:
a manifold to convey electrolyte solution to cells and to receive electrolyte solution from cells, wherein the manifold comprises,
an outer manifold plate, comprising,
  supply shunt passages to convey electrolyte solution to the cells, and
  return shunt passages to receive electrolyte solution from the cells; and
an inter manifold plate coupled to the outer manifold plate and comprising,
  supply shunt passages to convey electrolyte solution to the cells, and
  return shunt passages to receive electrolyte solution from the cells;
  wherein the supply and return shunt passages of the outer and inner manifold plates are configured to form serpentine paths:
a first sub-stack comprising a plurality of cells, wherein each cell includes a cell frame, each cell frame including,
  a first supply channel aperture in communication with the manifold,
  an inlet in communication with the first supply channel aperture,
  a first return channel aperture in communication with the manifold,
  an outlet in communication with the first return channel aperture,
  a second supply channel aperture in communication with the manifold, and
  a second return channel aperture in communication with the manifold; and
a second sub-stack comprising a plurality of cells, wherein each cell includes a cell frame, each cell frame including,
  a supply channel aperture in communication with the manifold and the second supply channel aperture of the first sub-stack, and
  and inlet in communication with the supply channel aperture,
  a return channel aperture in communication with the manifold and the second return channel aperture of the first sub-stack, and an outlet in communication with the return channel aperture.

15. The electrochemical battery of claim 14, wherein the supply shunt passages of the outer and inner manifold plates are configured to form parallel paths, and
wherein the return shunt passages of the outer and inner manifold plates are configured to form parallel paths.

16. The electrochemical battery of claim 14, wherein the outer manifold plate comprises:
an input well in communication with the supply shunt passages; and
an output well in communication with the return shunt passages.

17. The electrochemical battery of claim 16, wherein the outer manifold plate comprises:
an input aperture to enable communication with the inner manifold plate; and
an output aperture to enable communication with the inner manifold plate.

18. The electrochemical battery of claim 17, wherein the inner manifold plate comprises:
an input well in communication with the supply shunt passages and the input aperture of the outer manifold plate; and
an output well in communication with the return shunt passages and the output aperture of the outer manifold plate.

19. The electrochemical battery of claim 18, further comprising a manifold cover plate coupled to the outer manifold plate and comprising:
   a positive input in communication with the input well of the outer manifold plate;
   a negative input in communication with the input well of the inner manifold plate through the input aperture of the outer manifold plate;
   a positive output in communication with the output well of the outer manifold plate; and
   a negative output in communication with the output well of the inner manifold plate through the output aperture of the outer manifold plate.

20. The electrochemical battery of claim 14, wherein the outer manifold comprises:
   supply apertures extending through the outer manifold plate, each supply aperture in communication with a corresponding supply shunt passage; and
   return apertures extending through the outer manifold plate, each return aperture in communication with a corresponding return shunt passage.

21. The electrochemical battery of claim 20, wherein the outer manifold comprises:
   supply channels, each supply channel in communication with a corresponding supply aperture; and
   return channels, each return channel in communication with a corresponding return aperture.

22. The electrochemical battery of claim 21, wherein the inner manifold comprises:
   supply channel apertures extending through the inner manifold plate, each supply channel aperture in communication with a corresponding supply channel of the outer manifold plate; and
   return channel apertures extending through the inner manifold plate, each return channel aperture in communication with a corresponding return channel of the outer manifold plate.

23. The electrochemical battery of claim 14, wherein the inner manifold plate comprises:
   supply apertures extending through the inner manifold plate, each supply aperture in communication with a corresponding supply shunt passage; and
   return apertures extending through the inner manifold plate, each return aperture in communication with a corresponding return shunt passage.

24. The electrochemical battery of claim 23, wherein the inner manifold further comprises:
   supply channels, each supply channel in communication with a corresponding supply aperture; and
   return channels, each return channel in communication with a corresponding return aperture.

25. An electrochemical battery, comprising:
   a manifold to convey electrolyte solution to cells and to receive electrolyte solution from cells, wherein the manifold comprises,
   an outer manifold plate, comprising,
      supply shunt passages to convey electrolyte solution to the cells, and
      return shunt passages to receive electrolyte solution from the cells; and
   an inner manifold plate coupled to the outer manifold plate and comprising,
      supply shunt passages to convey electrolyte solution to the cells, and
      return shunt passages to receive electrolyte solution from the cells;
   wherein the supply and return shunt passages of the outer and inner manifold plates are configured to form serpentine paths;
   a first sub-stack including a plurality of cell frames, wherein each cell frame includes,
      a first positive supply channel aperture,
      a second positive supply channel aperture,
      a first positive return channel aperture,
      a second positive return channel aperture,
      a first negative supply channel aperture,
      a second negative supply channel aperture,
      a first negative return channel aperture,
      a second negative return channel aperture,
      wherein the first positive supply channel apertures of each cell frame in the first sub-stack are aligned to form a first positive supply channel configured to supply electrolyte solution to the first sub-stack,
      wherein the first positive return channel apertures of each cell frame in the first sub-stack are aligned to form a first positive return channel configured to return electrolyte solution from the first sub-stack,
      wherein the first negative supply channel apertures of each cell frame in the first sub-stack are aligned to form a first negative supply channel configured to supply electrolyte solution to the first sub-stack,
      wherein the first negative return channels of each cell frame in the first sub-stack are aligned to form a first negative return channel configured to return electrolyte solution from the first sub-stack; and
   a second sub-stack coupled to the first sub-stack and in communication with the second positive supply channel apertures, the second positive return channel apertures, the second negative supply channel apertures, and the second negative return channel apertures,
      wherein the second positive supply channel apertures of each cell frame in the first sub-stack are aligned to form a second positive supply channel configured to supply electrolyte solution to the second sub-stack,
      wherein the second positive return channel apertures of each cell frame in the first sub-stack are aligned to form a second positive return channel configured to return electrolyte solution from the second sub-stack,
      wherein the second negative supply channel apertures of each cell frame in the first sub-stack are aligned to form a second negative supply channel configured to supply electrolyte solution to the second sub-stack, and
      wherein the second negative return channels of each cell frame in the first sub-stack are aligned to form a second negative return channel configured to return electrolyte solution from the second sub-stack.

26. An electrochemical battery, comprising:
   an outer manifold plate, comprising,
      supply shunt passages to convey electrolyte solution,
      return shunt passages to receive electrolyte solution,
      an input aperture to pass electrolyte solution, and
      an output aperture to pass electrolyte solution; and
   an inner manifold plate coupled to the outer manifold plate and comprising,
      supply shunt passages in communication with the input aperture to convey electrolyte solution, and
      wherein the supply and return shunt passages of the outer and inner manifold plates are configured to form serpentine paths;
      return shunt passages in communication with the output aperture to receive electrolyte solution.

27. The electrochemical battery of claim 26, wherein the supply shunt passages of the outer and inner manifold plates are configured to form parallel paths, and wherein the return shunt passages of the outer and inner manifold plates are configured to form parallel paths.

28. The electrochemical battery of claim 26, wherein the outer manifold plate comprises:

an input well in communication with the supply shunt passages; and an output well in communication with the return shunt passages.

29. The electrochemical battery of claim 28, wherein the inner manifold plate comprises:

an input well in communication with the supply shunt passages and the input aperture; and an output well in communication with the return shunt passages and the output aperture.

30. The electrochemical battery of claim 29, further comprising a manifold cover plate coupled to the outer manifold plate and comprising:

a positive input in communication with the input well of the outer manifold plate;

a negative input in communication with the input well of the inner manifold plate through the input aperture;

a positive output in communication with the output well of the outer manifold plate; and a negative output in communication with the output well of the inner manifold plate.

31. The electrochemical battery of claim 26, wherein the outer manifold comprises:

supply apertures extending through the outer manifold plate, each supply aperture in communication with a corresponding supply shunt passage; and return apertures extending through the outer manifold plate, each return aperture in communication with a corresponding return shunt passage.

32. The electrochemical battery of claim 31, wherein the outer manifold comprises:

supply channels, each supply channel in communication with a corresponding supply aperture; and return channels, each return channel in communication with a corresponding return aperture.

33. The electrochemical battery of claim 32, wherein the inner manifold comprises:

supply channel apertures extending through the inner manifold plate, each supply channel aperture in communication with a corresponding supply channel of the outer manifold plate; and return channel apertures extending through the inner manifold plate, each return channel aperture in communication with a corresponding return channel of the outer manifold plate.

34. The electrochemical battery of claim 1, wherein at least one of the plurality of cells includes two inlets to each of the negative and positive compartments; and wherein at least one supply shunt passage is in communication with the two inlets to the negative compartment; and wherein at least one return shunt passage is in communication with the two inlets to the positive compartment.

35. The electrochemical battery of claim 1, wherein at least one of the plurality of cells includes two outlets to each of the negative and positive compartments; and wherein at least one return shunt passage is in communication with the two outlets to the negative compartment; and wherein at least one return shunt passage is in communication with the two outlets to the positive compartment.

* * * * *

UNITED STATES PATENT AND TRADEMARK OFFICE
CERTIFICATE OF CORRECTION

PATENT NO. : 7,687,193 B2
APPLICATION NO. : 11/893929
DATED : March 30, 2010
INVENTOR(S) : Matthew A. M. Harper It is certified that error appears in the above-identified patent and that said Letters Patent is hereby corrected as shown below:

Column 2, Line 57 reads, "...to the electrical power law, $P=1^2R$." which should read, "...to the electrical power law, $P=I^2R$."

Column 3, Line 22 reads, "...batteries may includes a wide variety of embodiments, the..." which should read, "...batteries may include a wide variety of embodiments; the..."

Column 5, Line 51 reads, "...battery is shown 200." which should read, "...battery 200 is shown."

Column 18, Line 5 reads, "...an inter manifold plate..." which should read, "...an inner manifold plate..."

Column 18, Line 13 reads, "...serpentine paths:" which should read, "...serpentine paths;"

Column 18, Line 35 reads, "...and inlet in communication..." which should read, "...an inlet in communication..."

Signed and Sealed this

Eighteenth Day of May, 2010

David J. Kappos
*Director of the United States Patent and Trademark Office*